United States Patent
Khvostichenko

(10) Patent No.: US 10,229,373 B1
(45) Date of Patent: *Mar. 12, 2019

(54) CONTEXT-BASED EVENT CREATION

(71) Applicant: Google LLC, Mountain View, CA (US)

(72) Inventor: Boris Khvostichenko, Gattikon (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,826

(22) Filed: Jun. 1, 2018

Related U.S. Application Data

(63) Continuation of application No. 14/505,405, filed on Oct. 2, 2014, now Pat. No. 10,007,886.

(51) Int. Cl.
  *G06Q 10/06* (2012.01)
  *G06F 3/0484* (2013.01)
  *G06F 9/54* (2006.01)

(52) U.S. Cl.
  CPC ..... *G06Q 10/06311* (2013.01); *G06F 3/0484* (2013.01); *G06F 9/542* (2013.01)

(58) Field of Classification Search
  CPC .. G06Q 10/06311; G06F 3/0484; G06F 9/542
  See application file for complete search history.

(56) References Cited

U.S. PATENT DOCUMENTS

| 6,603,489 B1 | 8/2003 | Edlund et al. |
| 8,812,419 B1 | 8/2014 | Teller et al. |
| 2014/0282915 A1* | 9/2014 | Tekwani ................ H04L 63/08 726/4 |
| 2015/0278199 A1 | 10/2015 | Hazen et al. |

\* cited by examiner

*Primary Examiner* — Sujay Koneru
*Assistant Examiner* — Mohamed N El-Bathy
(74) *Attorney, Agent, or Firm* — Brake Hughes Bellermann LLP

(57) ABSTRACT

Methods and computer systems are used to create context-based event entries. In one aspect, the method includes, at a computer system with one or more processors and memory: (1) receiving a content-less request to create an event entry; (2) selecting an applicable rule from a set of rules stored at the computer system in accordance with one or more context items, the one or more context items comprising one or more context items for the user, the set of rules comprising a plurality of distinct rules; (3) creating an event entry in accordance with the selected applicable rule and at least one of the one or more context items for the user, the event entry including one or more fields having content determined in accordance with the at least one of the one or more context items for the user; and (4) providing the event entry for display.

20 Claims, 15 Drawing Sheets

User Database 430

User Record 432-i
of User i (i=1,2,..., M)

User Records

CONTEXT-BASED EVENT CREATION

CROSS-REFERENCE TO RELATED APPLICATION

This application is a continuation of, and claims priority to, U.S. patent application Ser. No. 14/505,405, filed on Oct. 2, 2014, entitled "Context-Based Event Creation", the disclosure of which is incorporated by reference herein in its entirety.

TECHNICAL FIELD

The disclosed embodiments relate generally to event entry creation, for example, in the electronic calendars. More particularly, the disclosed embodiments relate to methods, computer systems, and graphical user interfaces for creating context-based event entries in the electronic calendars.

BACKGROUND

Electronic calendars are increasingly used to organize our lives. Such calendars are accessed from both desktop computers and portable computing devices (e.g., laptop computers, personal digital assistants (PDAs), mobile phones, and wearable computers).

One problem that limits more widespread use of electronic calendars is the process of creating the electronic calendar entries. For example, a user typically needs to determine the subject of the event, and then inputs content in multiple fields of each calendar entry, such date, start and end time, location, and contact information for any other participants associated with the event. This process of creating a calendar entry can be cumbersome, discouraging many computer and smart phone users from effectively using their electronic calendar. Thus, it would be desirable to have more efficient ways to create the event entries.

SUMMARY

Various embodiments of methods, computer systems, graphical user interfaces, and data structures within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used for creating context-based event entries. In one aspect, a content-less request to create an event entry is received at a computer system in accordance with a triggering event, an applicable rule is selected from a set of rules in accordance with one or more context items, and an event entry is created in accordance with the selected applicable rule and at least one of the one or more context items.

BRIEF DESCRIPTION OF THE DRAWINGS

For a better understanding of the aforementioned aspects of the invention as well as additional aspects and embodiments thereof, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Figure 1:
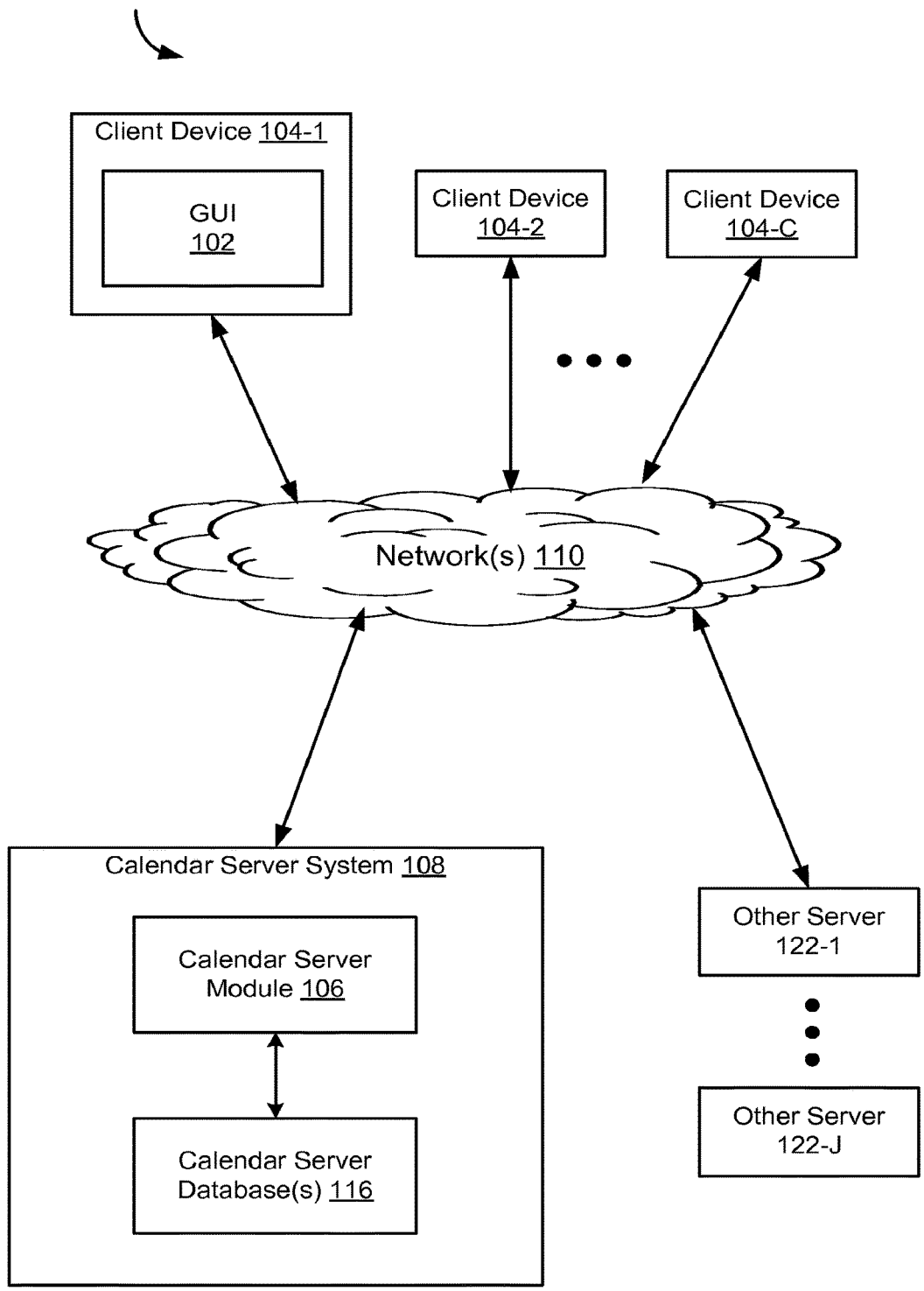
FIG. 1 is a block diagram of a server-client environment in accordance with some embodiments.

The various embodiments described herein include methods, computer systems, and graphical user interfaces (GUIs) for creating context-based event entries. The context-based event entries are created based a user's context information, such as a current location, a current activity, and/or a previous event. The user's context information can be used for determining a subject and information related to one or more fields of an event entry to be created, thereby eliminating the need for the user to determine and input the contents related to one or more fields, such as a title, a location, a contact, or a description, of the event entry. By pre-filling these fields, instead of requiring the user to type in the related fields, the event entry creation process becomes more efficient and time-saving, resulting in an improved user experience and a more efficient user-machine interface. It is to be understood that, in the present disclosure, creating event entries in a user's calendar is discussed as an example. One of ordinary skill in the art would understand that the methods and computer systems for creating context-based event entries as discussed in the present disclosure can be used in event entry creation applications associated with any other suitable software applications or services including, but not limited to, reminder creation, task creation, and email creation.

(A1) More specifically, some embodiments include a method of creating context-based event entries. In some embodiments, the method includes, at a computer system with one or more processors and memory: (1) receiving a content-less request to create an event entry, the content-less request corresponding to a triggering event detected by an end device, the triggering event being initiated by a user of the end device; and in response to the received content-less request, (2) selecting an applicable rule, from a set of rules stored at the computer system, in accordance with one or more context items, distinct from the triggering event, the one or more context items comprising one or more context items for the user, the set of rules comprising a plurality of distinct rules; (3) creating an event entry in accordance with the selected applicable rule and at least one of the one or more context items for the user, the event entry including one or more fields having content determined in accordance with the at least one of the one or more context items for the user; and (4) providing the event entry for display.

(A2) In some embodiments of the method of A1, the method includes determining a subject of the event entry solely in accordance with at least one of the one or more context items for the user.

(A3) In some embodiments of the method of A1, the triggering event is non-differentiating with respect to a subject of the event entry created in response to the received content-less request.

(A4) In some embodiments of the method of any of A1 to A3, the method further comprises, prior to receiving the content-less request to create an event entry, storing the one or more context items for the user, wherein at least one of the one or more context items is detected by the end device.

(A5) In some embodiments of the method of any of A1 to A4, the method comprises storing the set of rules, wherein a respective rule correlates one or more context parameters with a respective event pattern.

(A6) In some embodiments of the method of any of A1 to A5, selecting the applicable rule includes: determining whether at least one of the one or more context items matches a corresponding context parameter of the applicable rule; in accordance with a selection criterion, including a determination that at least one of the one or more context items matches a corresponding context parameter of the applicable rule, selecting the applicable rule, which correlates the corresponding context parameter of the applicable rule with the event pattern of the applicable rule; and identifying context items, if any, of the one or more context items, that match the corresponding context parameter of the applicable rule; and creating the event entry includes: creating the one or more fields of the event entry in accordance with the event pattern, wherein the one or more fields have content in accordance with the identified context items that match corresponding parameters of the one or more context parameters of the applicable rule.

(A7) In some embodiments of the method of any of A5 to A6, the method further comprises: using machine learning, generating a plurality of rules in the set of rules, each rule in the plurality of rules correlating one or more context parameters with a respective event pattern, wherein the event pattern of each rule in the plurality of rules corresponds to one or more previous event entries of the user or a community of users, each of one or more previous event entries including one or more fields with previous event information; and wherein the context parameters of a respective rule of the plurality of rules correspond to context items that are associated with the previous event entries, the previous event entries corresponding to the respective rule.

(A8) In some embodiments of the method of any of A1 to A7, providing the event entry includes: providing one or more editable fields of the event entry, at least one of the one or more editable fields being pre-filled with event information, and wherein the event information corresponds to the at least one of the one or more context items and is determined in accordance with the applicable rule.

(A9) In some embodiments of the method of any of A1 to A7, providing the event entry includes providing, to the end device, multiple event entries for selection by the user, each created in accordance with a different applicable rule.

(A10) In some embodiments of the method of A9, the method comprises providing one or more editable fields for a user-selected event entry of the multiple event entries to the end device, the one or more editable fields being pre-filled with event information corresponding to the at least one of the one or more context items.

(A11) In some embodiments of the method of any of A1 to A10, the computer system comprises a server system; and providing the event entry for display comprises providing the event entry to the end device for display.

(A12) In some embodiments of the method of any of A1 to A10, the computer system comprises the end device.

(A13) In another aspect, a computer system includes (1) one or more processors, and (2) memory storing one or more programs, which when executed by the one or more processors cause the computer system to perform operations of any of the methods A1 to A12 described herein.

(A14) In yet another aspect, some embodiments include a non-transitory computer readable storage medium, storing one or more programs configured for execution by a computer system having one or more processors, the one or more programs including instructions for performing any of the methods A1 to A12 described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods and systems have not been described in exhaustive detail so as not to unnecessarily obscure more pertinent aspects of the embodiments described herein.

FIG. 1 is a block diagram of a server-client environment 100 in accordance with some embodiments. In some implementations, the server-client environment 100 includes one or more client devices 104-1, 104-2 . . . 104-C, a calendar server system 108, other servers 122-1 . . . 122-J (such as email servers and/or web hosting servers), and communication network(s) 110 for interconnecting these components. In some embodiments, client device 104-1 includes graphical user interface (GUI) 102 and provides various client-side functionalities (e.g., displaying and editing a user's calendar, instant messaging, and social networking services). Calendar server system 108 provides server-side functionalities (e.g., creating an event entry on a user's calendar, instant messaging, and social networking services) for any number of client devices 104-1 . . . 104-C.

Examples of client devices 104-1 . . . 104-C include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some embodiments, calendar server system 108 is implemented on one or more standalone data processing apparatuses or a distributed network of computers. In some embodiments, calendar server system 108 also employs various virtual devices and/or services of third party service providers (e.g., third-party cloud service providers) to provide the underlying computing resources and/or infrastructure resources of calendar server system 108.

As shown in FIG. 1, server-client environment 100 includes both a client-side portion (e.g., client devices 104-1 . . . 104-C) and a server-side portion (e.g., calendar server system 108). In some embodiments, data processing (e.g., calendar event entry creating and displaying) is implemented as a standalone application installed on a client device. Alternatively, the division of functionalities between the client-side and server-side portions of data processing in the server-client environment 100 can vary in different embodiments. For example, in some embodiments, the client device is a thin-client that provides only user-facing input and output processing functions, and delegates all other data processing functionalities to a backend server (e.g., calendar server system 108).

Figure 2:
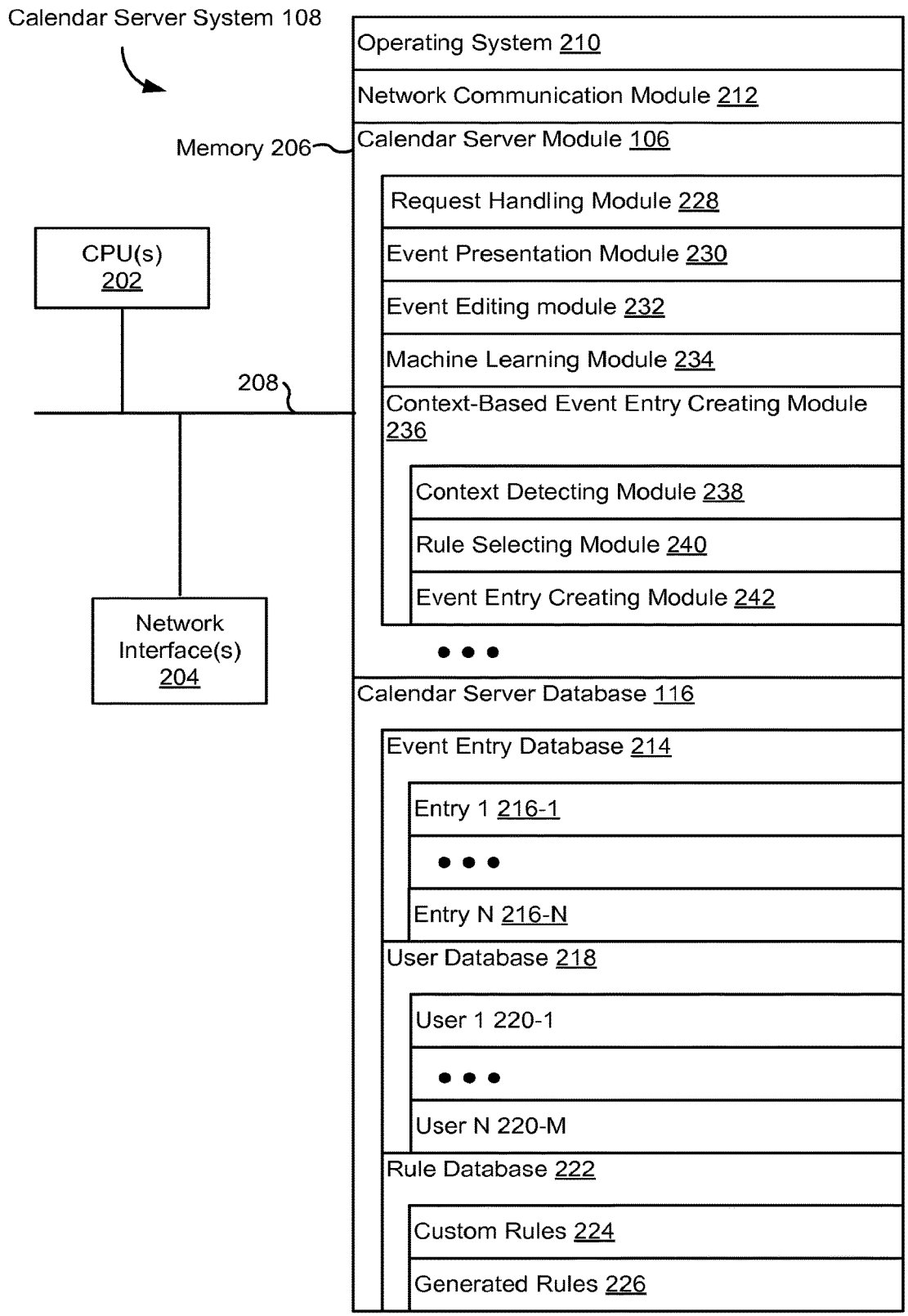
FIG. 2 is a block diagram illustrating a server system in accordance with some embodiments.

FIG. 2 is a block diagram illustrating a calendar server system 108 in accordance with some embodiments. The calendar server system 108 typically includes one or more processing units (CPUs) 202, one or more network interfaces or other communications interfaces 204, memory 206, and one or more communication buses 208 for interconnecting these components. The communication buses 208 may include circuitry (sometimes called a chipset) that interconnects and controls communications between system components. The calendar server system 108 may optionally include a graphical user interface (GUI) (not shown), which typically includes a display device, a keyboard, a mouse or other pointing device and a touch sensitive display screen.

Memory 206 includes high-speed random access memory, such as dynamic random-access memory (DRAM), static random-access memory (SRAM), double data rate synchronous dynamic random-access memory (DDR RAM) or other random access solid state memory devices; and, optionally, includes non-volatile memory, such as one or more magnetic disk storage devices, one or more optical disk storage devices, one or more flash memory devices, or one or more other non-volatile solid state storage devices. Memory 206 optionally further includes one or more storage devices remotely located from the CPU(s) 202. Memory 206, or alternately the non-volatile memory device(s) within memory 206, comprises a non-transitory computer readable storage medium. In some embodiments, memory 206, or the non-transitory computer readable storage medium of memory 206, stores the following programs, modules, and data structures, or a subset thereof:

- operating system 210 that includes procedures for handling various basic system services and for performing hardware dependent tasks;
- network communication module 212 that is used for connecting calendar server system 108 to other computers devices (e.g., client devices 104-1 . . . 104-C, and/or other servers 122-1 . . . 122-J) via the one or more Network Interfaces 204 (wired or wireless) and one or more networks 110 (FIG. 1), examples of which are listed above;
- calendar server module 106 that receives various requests from the client devices, provides data processing for creating calendar event entries, and provides the created event entries to the client devices;
- calendar server database 116 that stores data related to users calendar entries, user profiles, and rules used for creating calendar event entries.

In some embodiments, the calendar server module 106 includes, but is not limited to:

- request handling module 228 that handles various requests from the client devices, the various requests including a content-less request to create an event entry in an electronic calendar;
- event presentation module 230 that provides the event entry created by the server system 108 (e.g., event entry creating module 242) to a client device for display on the corresponding client device;
- event editing module 232 that is used for editing calendar event entries, with various event editing functionalities;
- machine learning module 234 that generates one or more rules, which are rules for creating calendar event entries, wherein the one or more rules are generated based on data processing of previously created calendar entries of a user or a community of users; and
- context-based event entry creating module 236 that is used for creating context-based event entries, including, but is not limited to:
  - context detecting module 238 that detects one or more context items associated with a user (e.g., a user's previous event, and/or a user's current event);
  - rule selecting module 240 that selects an applicable rule in accordance with the one or more detected context items associated with the user (e.g., selecting an applicable rule based on a determination that a detected context item matches a corresponding context parameter of a rule); and
  - event entry creating module 242 that creates an event entry in accordance with the selected applicable rule and the detected context items.

In some embodiments, the calendar server database 116 includes, but is not limited to, the following data structures, or a subset or superset thereof:

- event entry database 214, which stores calendar event entries (e.g., event entries 1 through N 216-1 . . . 216-N);
- user database 218, which stores one or more user records (e.g., user records 220-1 through user records 220-M) associated with one or more users (e.g., user 1 through user M), each user record including, for example, a user profile (e.g., a user ID, an account name, login credentials, and/or custom parameters such as a user's age, a user's home location, and/or one or more parameters indicating interests of the user), a user contact list (e.g., a user's recent contacts via emails and/or phone calls, and/or a user's saved contacts), and/or one or more context items associated with the user; and
- rule database 222, which stores rules used for creating event entries in response to requests from client devices, the rules including, for example, custom rules 224 pre-defined by a server administrator or a user, and/or machine generated rules 226 generated based on machine learning (e.g., machine learning performed by machine learning module 234).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Although FIG. 2 shows calendaring server system 108 as a number of discrete items, FIG. 2 is intended more as a functional description of the various features which may be present in a server rather than as a structural schematic of the embodiments described herein. In practice, and as recognized by those of ordinary skill in the art, some items shown separately could be combined and some items could be separated. For example, some items shown separately in FIG. 2 could be implemented on single servers and single items could be implemented by one or more servers. The actual number of servers in calendar server system 108 and how features are allocated among them will vary from one implementation to another, and may depend in part on the amount of data traffic that the system must handle during peak usage periods as well as during average usage periods.

Figure 3A:
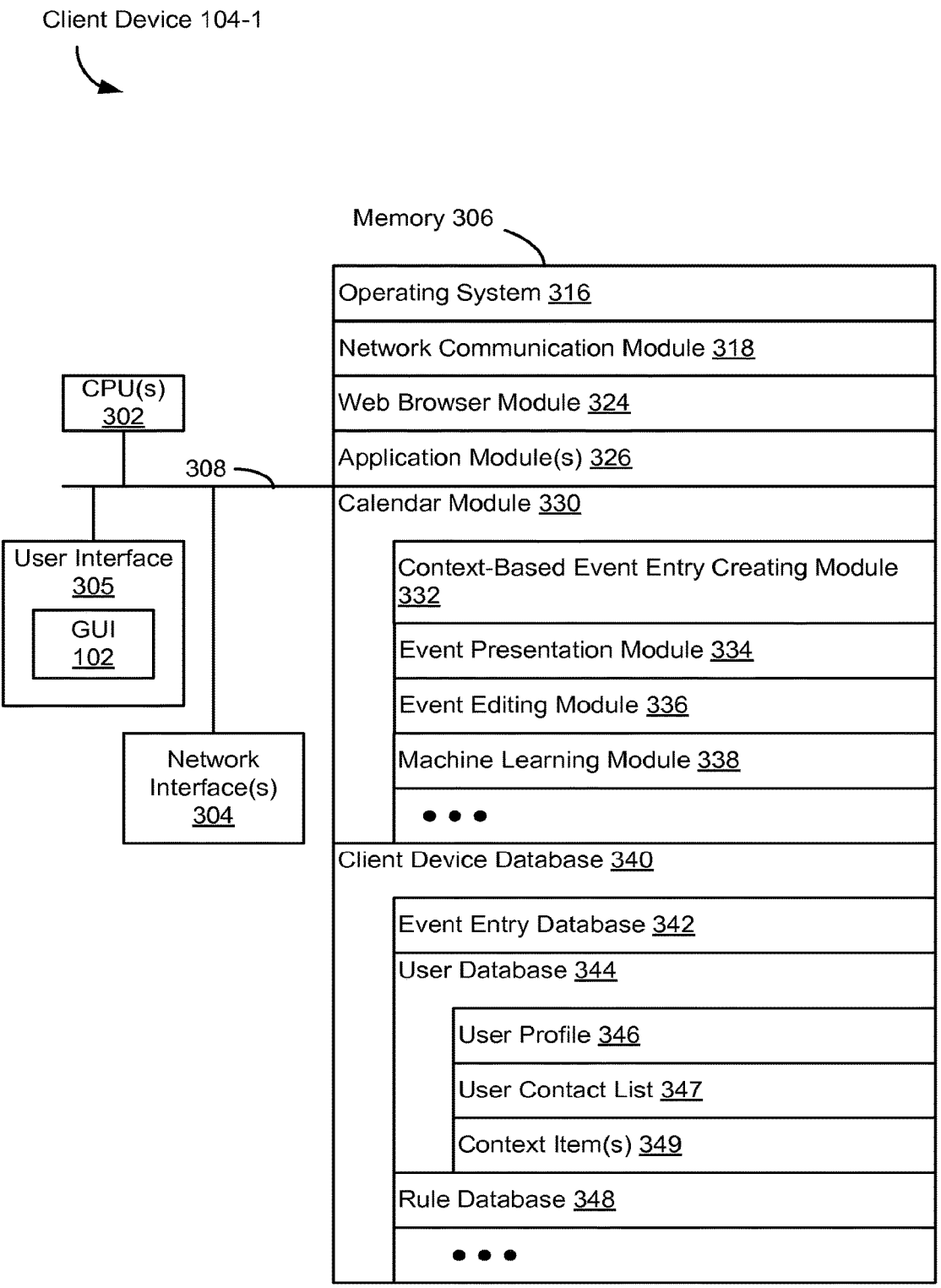
FIGS. 3A and 3B are block diagrams illustrating exemplary embodiments of client devices in accordance with some embodiments.

FIG. 3A is a block diagram illustrating an exemplary embodiment of a client device (e.g., client device 104-1 of FIG. 1). In some embodiments, client device 104-1 includes one or more processing units (CPUs) 302, one or more network interfaces or other communications interfaces 304, user interface 305, memory 306, and one or more communication buses 308 for interconnecting these components. Communication buses 308 may include circuitry (sometimes called a chipset) that interconnects and controls communications between system components.

In some embodiments, user interface 305 presents a graphical user interface (GUI) 102 using one or more output devices and receives user inputs via one or more input devices. The one or more output devices, typically including one or more visual displays and optionally including one or more speakers, enable presentation of media content by client device 104-1. In some embodiments, the one or more input devices include user interface components that facilitate user input, such as a keyboard, a mouse, a voice-command input unit or microphone, a touch screen display, a touch-sensitive input pad, a camera, a gesture capturing camera, and/or other input buttons or controls, and optionally include two or more of such input devices. Furthermore, client device 104-1 may use a microphone and voice recognition, or a camera and gesture recognition to supplement or replace a physical or virtual keyboard.

Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally further includes one or more storage devices remotely located from the CPU(s) 302 (e.g., cloud storage). Memory 306, or alternately the non-volatile memory device (s) within memory 306, comprises a non-transitory computer readable storage medium. In some embodiments, memory 306 or the computer readable storage medium of memory 306 stores the following programs, modules and data structures, or a subset or superset thereof:

operating system 316, which includes procedures for handling various basic system services and for performing hardware dependent tasks;

network communication module 318, which is used for connecting client device 104-1 to other computer systems (e.g., calendar server system 108, other servers 122, and/or other client devices 104-2 . . . 104-C) via the one or more communications network interfaces 304 (wired or wireless) and one or more networks 110 (FIG. 1), such as the Internet, other wide area networks, local area networks, metropolitan area networks, and so on;

web browser module 324, for formatting and displaying web pages in GUI 102;

application module(s) 326, for execution by client device 104-1, such as games, application marketplaces, payment platforms, social network platforms, and/or other applications;

calendar module 330, which implements the client side of a calendar application; calendar module is used for creating, displaying, and/or editing calendar event entries, and sending requests to and receiving calendar related information from calendar server system 108; and client device database 340, which stores data related to one or more users associated with client device 104-1, such as a user profile, previously created calendar entries associated with the user, and rules used for creating calendar event entries.

In some embodiments, calendar module 330 at client device 104-1 includes, but is not limited to, one or more of the following modules:

context-based event entry creating module 332, which is used for creating context-based event entries; context-based event entry creating module 332 is configured to, for example, detect one or more context items (e.g., a location, and/or a current event) associated with a user, select an applicable rule in accordance with one or more detected context items associated with the user, and/or create an event entry in accordance with the selected applicable rule and the detected context items;

event presentation module 334, which is used for enabling presentation, via user interface 305, of an event entry created by client device 104-1, or created by and received from calendar server system 108;

event editing module 336, which provides event editing functionalities for editing event entries; and optionally, machine learning module 338, which is used for generating one or more rules, which in turn are used to create event entries, where the one or more rules are generated based on data processing of previously created event entries associated with a user of client device 104-1.

In some embodiments, client device database 340 includes the following data structures, or a subset or superset thereof, but is not limited to:

event entry database 342, which stores previously created event entries corresponding to one or more users of (or associated with) client device 104-1;

user database 344, which stores one or more user records of one or more users of (or associated with) client device 104-1, each user record including, for example, one or more of the user database fields described above with reference to user database 218, such as a user profile 346, as described above, a user contact list 347, as described above, and/or one or more context item(s) 349, for example, a current location of the user, and/or a current activity of the user; and optionally, rule database 348, which stores rules used for creating event entries in response to requests from client devices, as described above with respect with rule database 222; optionally rule database 348 in client device 104-1 stores a subset of the rules in a respective server-side rule database 222.

Figure 3B:
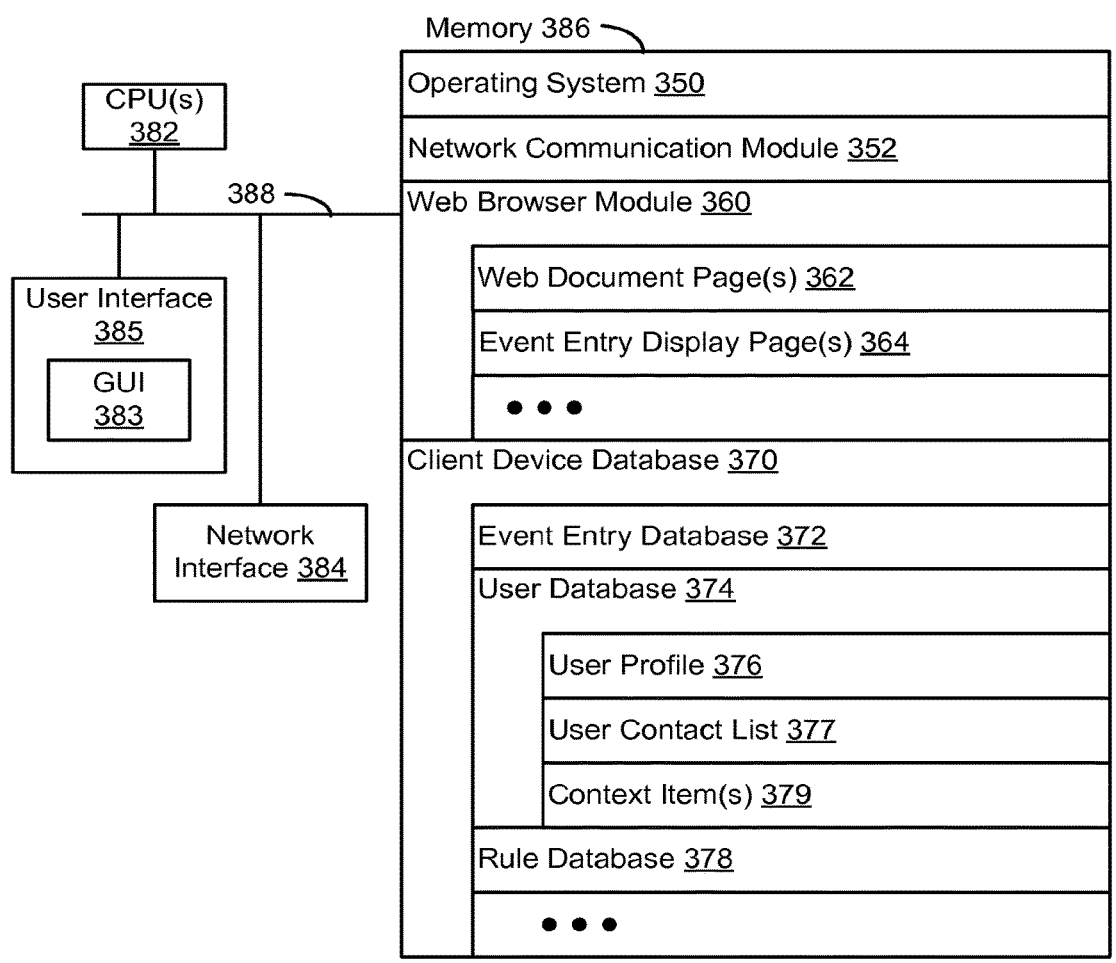

FIG. 3B is a block diagram illustrating an alternative embodiment of a client device 104-2, sometimes herein referred to as a "thin" client. In some embodiments, client device 104-2 does not include a calendar module 330 or client-side calendar application. Instead, server system 108 performs calendaring functions, including calendar event entry generation, on behalf of client device 104-2. More specifically, in some embodiments, context-based entry creating functions, such as rule selection and event entry generation, are performed at server system 108, and a created event entry is sent to client device 104-2 for display and editing, using a web browser module 360. For example, the created event entry may be included in a web page, represented by event entry display page 364 in FIG. 3B.

As shown in FIG. 3B, client device 104-2 includes user interface 385, which presents a GUI 383. Client device 104-2 also includes one or more processing units (CPUs) 382, one or more network interfaces 384, memory 386, and one or more communication buses 388 for interconnecting these components. Communication buses 388 may include circuitry (sometimes called a chipset) that interconnects and controls communications between system components. In some embodiments, hardware components of client device 104-2 may be similar to corresponding elements of client device 104-1, illustrated in FIG. 3A. In some embodiments, memory 386 or the computer readable storage medium of memory 386 stores the following programs, modules and data structures, or a subset or superset thereof:

- operating system 350, which includes procedures for handling various basic system services and for performing hardware dependent tasks;
- network communication module 352, which is used for connecting client device 104-2 to other computer systems (e.g., calendar server system 108, other servers 122, and/or other client devices 104-1, 104-3, . . . 104-C) via the one or more communications network interfaces 384 (wired or wireless) and one or more networks 110 (FIG. 1), such as the Internet, other wide area networks, local area networks, metropolitan area networks, and so on;
- web browser module 360, for formatting and displaying web pages in GUI 383, including but not limited to:
  - web document page(s) 362 that display various internet web pages; and
  - event entry display page(s) 364 that display event entries on a user's electronic calendar; and
- optionally, client device database 370, which stores data related to one or more users associated with client device 104-2, such as a user profile, previously created calendar entries associated with the user, and rules used for creating calendar event entries.

In some embodiments, the client device database 370 includes the following data structures, or a subset or superset thereof, but is not limited to:

- event entry database 372, which stores previously created event entries corresponding to one or more users of (or associated with) client device 104-2;
- user database 374, which stores one or more user records of one or more users of (or associated with) client device 104-2 respectively, each user record including, for example, one or more of the following:
  - user profile 376 including, for example, a user ID, an account name, login credentials, and/or custom parameters such as a user's age, a user's home location, user's hobbies;
  - user contact list 377 including, for example, a user's recent contacts via emails and/or phone calls, and/or a user's saved contacts; and
  - context item(s) 379 of the user including, for example, a current location of the user, and/or a current activity of the user; and
- optionally, rule database 378, which stores rules used for creating event entries in response to requests from client devices, as described above with respect with rule database 222; optionally rule database 348 in client device 104-1 stores a subset of the rules in a respective server-side rule database 222.

In some embodiments, client device 104-2 does not include an event entry database 374, a user database 374 and/or a rule database 378. In such embodiments, calendar server system 108 provides such databases. Furthermore, as noted above, in some embodiments, at least some functions performed by calendar module 330 (FIG. 3A) of client device 104-1 are handled by calendar server module 106 in calendar server system 108 instead, and calendar event entries (e.g., event entries having one or more editable fields) generated by server system 108 are sent to client device 104-2 as a web page, html document, or other structured document for rendering and display by web browser module 360. In some embodiments, embedded code (e.g., programs or other executable instructions) in calendar event entry display page(s) 364 enables a user of client device 104-2 to edit a displayed event entry and submit the edited event entry to server system 108. In some embodiments, when the embedded code is executed by the web browser module 360, requests to create and/or edit context-based calendar entries are sent to calendar server system 108 for performing the corresponding functions to create and/or edit context-based calendar entries.

Each of the above identified elements may be stored in one or more of the previously mentioned memory devices of client device 104-2, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306 or memory 386, optionally, stores a subset of the modules and data structures identified above. Furthermore, memory 306 or memory 386, optionally, stores additional modules and data structures not described above.

In some embodiments, at least some of the functions of calendar server system 108 are performed by client device 104-1, and the corresponding sub-modules of these functions may be located within client device 104-1 rather than calendar server system 108. Furthermore, in some embodiments, at least some of the functions of client device 104-1 are performed by calendar server system 108, and the corresponding sub-modules of these functions may be located within calendar server system 108 rather than client device 104-1. Client device 104-1, client device 104-2, and calendar server system 108 shown in FIGS. 2, 3A and 3B, respectively, are merely illustrative, and different configurations of the modules for implementing the functions described herein are possible in various embodiments.

Figure 4A:
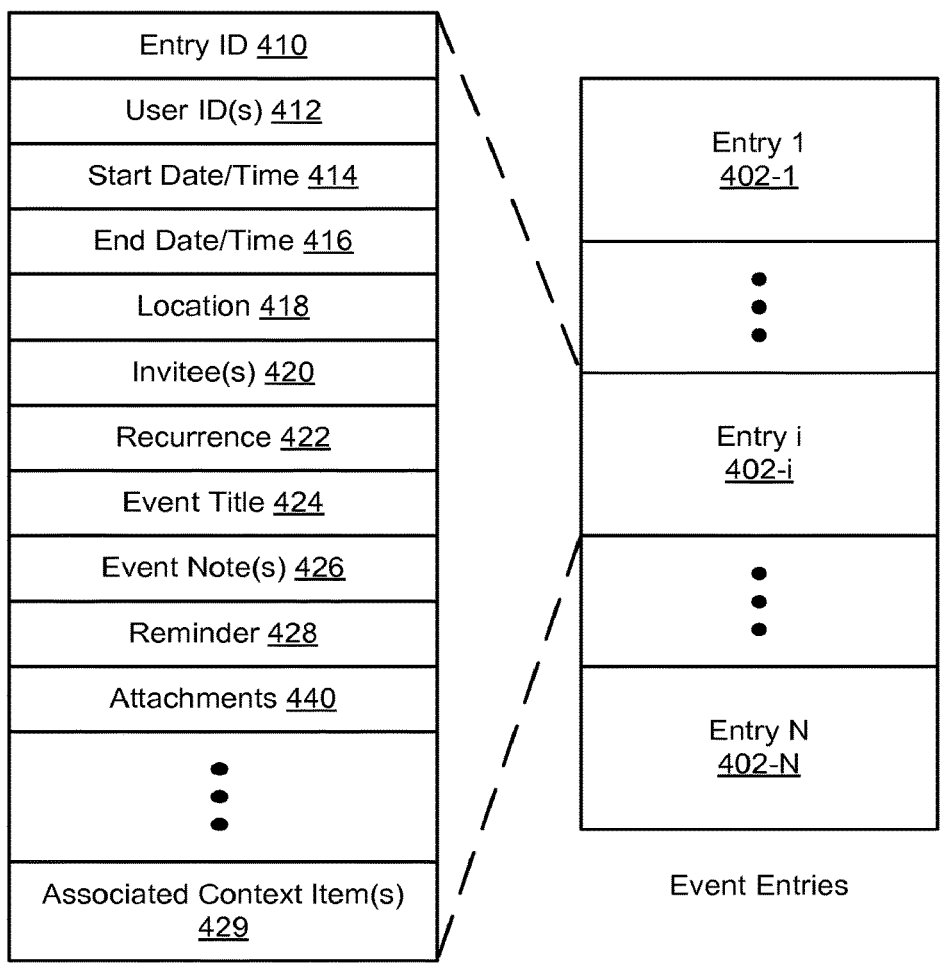
FIG. 4A is a block diagram illustrating an exemplary event entry database in accordance with some embodiments.

FIG. 4A is a block diagram illustrating an exemplary event entry database 400 in accordance with some embodiments. The event entry database 400 of FIG. 4A can be implemented as event entry database 214 of calendar server system 108 of FIG. 2, event entry database 342 of client device 104-1 of FIG. 3A, or event entry database 372 of client device 104-1 of FIG. 3B. As shown in FIG. 4A, event entry database 400 stores previously created event entries, for example entry 1 (402-1) through entry N (402-N), where N may represent any suitable number of entries. As discussed below, in some embodiments, these previously created event entries are used as input to a machine learning module, such as machine learning module 234, for generating rules, which are then used to create context-based event entries.

In some embodiments as shown in FIG. 4A, an event entry (e.g., entry i 402-*i*, i=1, 2, . . . N) includes the following fields, or a subset or superset thereof:
- entry ID 410 that uniquely identifies a particular event entry (e.g., an n-bit binary number);
- user ID(s) 412 that identifies the user(s) associated with the event entry (e.g., n-bit binary number(s) or e-mail addresses);
- start date/time 414 of the event;
- end date/time 416 of the event;
- location 418 of the event;
- invitee(s) 420 to share the event;
- recurrence parameters 422 for the event, indicating whether the event recurs, and if so, when;
- event title 424, sometimes called the subject of the event;
- event note(s) 426 (e.g., an event description);
- reminder 428 (e.g., indicating how much time, prior to the event start time, to send a reminder the user(s) associated with the event entry);
- attachments 440 (e.g., files, such as files containing figures, drawings, pictures, worksheets, text or other information), such as attachments made available to the invitee(s) by the creator of the event; and
- associated context item(s) 429, including any context item(s) associated with the generation of the event entry (e.g., a location, a date/time, and an activity of the user when the user requested to create event entry i).

As noted above, in some embodiments, event entries in database 400 include a subset of the fields listed above. Furthermore, in some embodiments, event entries in database 400 include one or more additional fields.

Figure 4B:
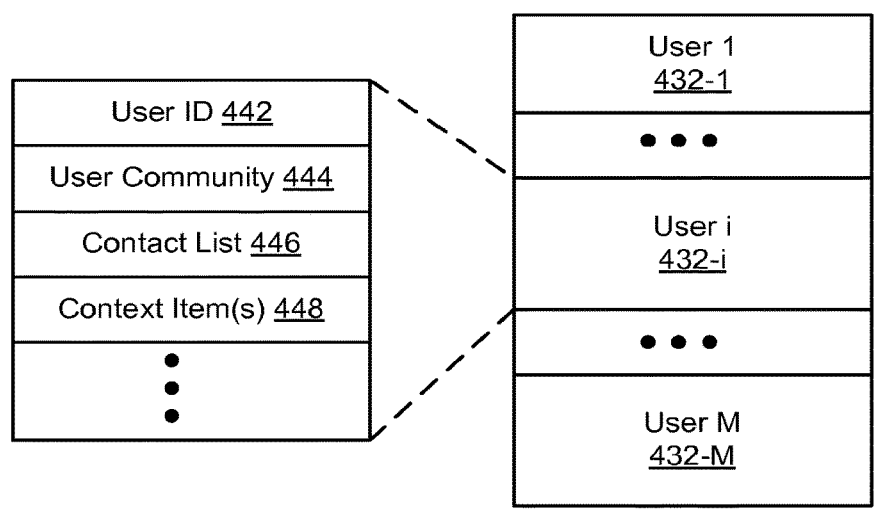
FIG. 4B is a block diagram illustrating an exemplary user database in accordance with some embodiments.

FIG. 4B is a block diagram illustrating an exemplary user database 430 in accordance with some embodiments. In some embodiments, user database 430 of FIG. 4B is implemented as user database 218 of calendar server system 108 as shown in FIG. 2. In such implementations, user database 430 stores multiple user records 432-1 through 432-M (or user records 220-1 through 2201-M, FIG. 2) associated with user 1 through user M respectively. In some embodiments, user database 430 of FIG. 4B is implemented as the user database 344 of client device 104-1 of FIG. 3A, or user database 374 of client device 104-2 of FIG. 3B. In these implementations, user database 430 stores one or more user records (e.g., user records 432-1 through 432-M) associated with one or more users (e.g., user 1 through user M) of (or associated with) client device 104-1 or 104-2.

In some embodiments as shown in FIG. 4B, a user record (e.g., user record 432-*i* associated with user i, i=1, 2, . . . M) includes the following fields of information, or a subset or superset thereof:
- user ID 442 that identifies a particular user associated with a user record (e.g., an n-bit binary number, or an email address, etc.);
- user community 444 that identifies a community to which the user belongs or that is associated with the user (e.g., a group including the user, etc.);
- contact list 446 including, for example, the user's recent contacts via emails and/or phone calls, and/or the user's saved contacts; contact list 446 corresponds to contract list 347 of user database 344, and/or contact list 377 of user database 374; and
- context item(s) 448 including, but not limited to, a current location of the user, a current activity of the user, a recently completed activity of the user, a calendar entry corresponding to a current activity or, alternatively, a planned current activity of the user (e.g., without regard to whether the user is actually performing the planned current activity), and/or a calendar entry corresponding to a recently completed activity of the user or, alternatively, corresponding to an activity of the user that was planned for a time period in the recent past (e.g., without regard to whether the user actually performed the planned activity); context item(s) 448 corresponds to context item(s) 349 of user database 344, and/or context item(s) 379 of user database 374.

Figure 4C:
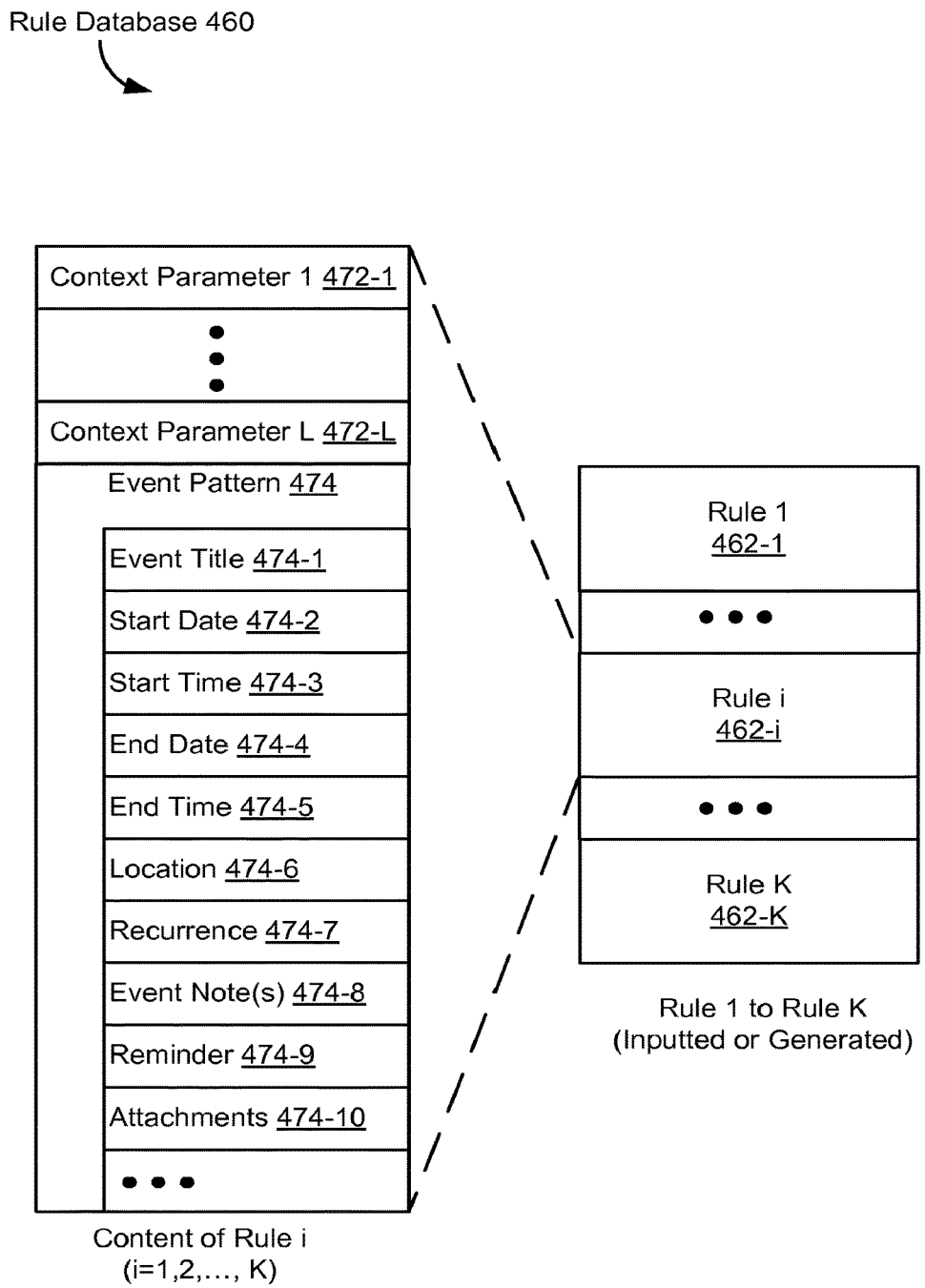
FIG. 4C is a block diagram illustrating an exemplary rule database in accordance with some embodiments.

FIG. 4C is a block diagram illustrating an exemplary rule database 460 in accordance with some embodiments. Rule database 460 of FIG. 4C can be implemented as rule database 222 of calendar server system 108 of FIG. 2, rule database 348 of client device 104-1 of FIG. 3A, or the rule database 378 of client device 104-2 of FIG. 3B. As shown in FIG. 4C, rule database 460 stores one or more rules that can be used for creating event entries, for example rule 1 (462-1) through rule R (462-K), where K may represent any suitable number of rules. In some embodiments, these rules are used for creating event entries. In some embodiments, these rules stored at the rule database 460 include custom rules (e.g., pre-defined by a server administrator or a user), and/or generated rules (e.g., generated using machine learning algorithms). Custom rules are sometimes called hand-coded rules, or hard coded rules.

In some embodiments as shown in FIG. 4C, a rule (e.g., rule i 462-*i*, i=1, 2, . . . K) correlates one or more context parameters (e.g., context parameters 472-1 . . . 472-L) to an event pattern (e.g., event pattern 474). A rule (e.g., rule i 462-*i*, i=1, 2, . . . K) may include the following information:
- context parameters 1 through L (472-1 . . . 472-L) (e.g., a recent appointment, a location of an event, a reminder interval of an event, a location of the user who has requested generation of a new event, information identifying one or more participants of an event, an title of an event entry, etc.); and
- event pattern 474 including one or more fields (e.g., fields 474-1 through 474-10) used for creating an event entry.

In some embodiments, rules are predefined for respective specific situations, and each rule maps specific context parameter(s) (e.g., context parameters 472-1 . . . 472-L) to a specific event pattern (e.g., event pattern 474) with multiple fields (e.g., fields 474-1 through 474-10). The event pattern may be used as a template for creating an event entry. For example, the one or more context parameters 472 of the rule include a current location of the user requesting generating of an event entry, and a recent appointment of the user. The corresponding rule correlates these context parameters to an event pattern related to an appointment, such as follow up appointment corresponding to the recent appointment. The event pattern may include one or more fields of an event entry, such as event title, start date, start time, end date, end time, etc. In some embodiments, or for some rules, the event pattern maps two or more context parameters (e.g., a subject, a location, a reminder interval, etc.) to corresponding fields of the event entry to be created, while one or more of the other fields (e.g., date, time, etc.) of the event entry may be unmapped by the event pattern, and thus require input from the user. In some embodiments, one or more fields of the event pattern may be pre-filled with information extracted from context information associated with the user, and/or previous related event entries associated with the user (e.g., event entries in the user's online calendar, as represented by event entries in event entry database 342 or event entry database 214. For example, the event title of the created event entry is pre-filled with "dentist appointment", and the event location of the created event entry is pre-filled with the address of a dental care clinic, which also is the current location of the user. In some embodiments, in accordance with a determination that a particular attachment or set of attachments is consistently attached to events consistent with a particular rule 462-*i*, the event pattern 474 includes that attachment or set of attachments (or pointers or other references to such attachments), enabling them to be attached to events created using the particular rule. Other fields, such as start date and time, and end date and time, require input from the user. In some embodiments, the pre-defined custom rules, i.e., the mapping between the context parameters and the corresponding event patterns, are stored in a lookup table.

In some embodiments, the generated rules stored at rule database 460 are generated by a machine learning process performed by a machine learning module (e.g., machine learning module 234 of calendar server system 108 of FIG. 2, or machine learning module 338 of client device 104-1 of FIG. 3A). In some embodiments, data related to previous event entries associated with a user, and context items associated with those previous event entries (e.g., associated context item(s) 429, FIG. 4A) are stored in event entry database 400 (FIG. 4A). These data are used by a machine learning process to generate a rule that can be used to create a future event entry. For example, the machine learning module learns that the user previously requested to create an event entry related to a next dentist appointment, when the user just had a dentist appointment, and the user was still at the dental care clinic. A rule generated by the machine learning process correlates one or more context parameters, such as a location of a user when the user requested to create an event entry for a future dental appointment, and a previous appointment of the user with a dentist at the dental care clinic, which is at a location matching the location of the user when submitting the request, to an event pattern related to a next appointment with the dentist at the dental care clinic.

In some embodiments, data related to one or more fields of a previous event entry, and the respective previous context items associated with each field entry are used for the machine learning process to generate a rule. For example, the machine learning module learns an event title "dentist appointment" and a location of a dental care clinic of a previous dentist appointment entry were inputted when the user was at the dental care clinic. In this implementation, a rule can be generated to correlate one or more context parameters, such as a location of a user when the user requests to create an event entry, and one or more fields of a previous event entry associated with the location of the user, to an event pattern related to one or more fields of a next event entry.

Figure 5A:
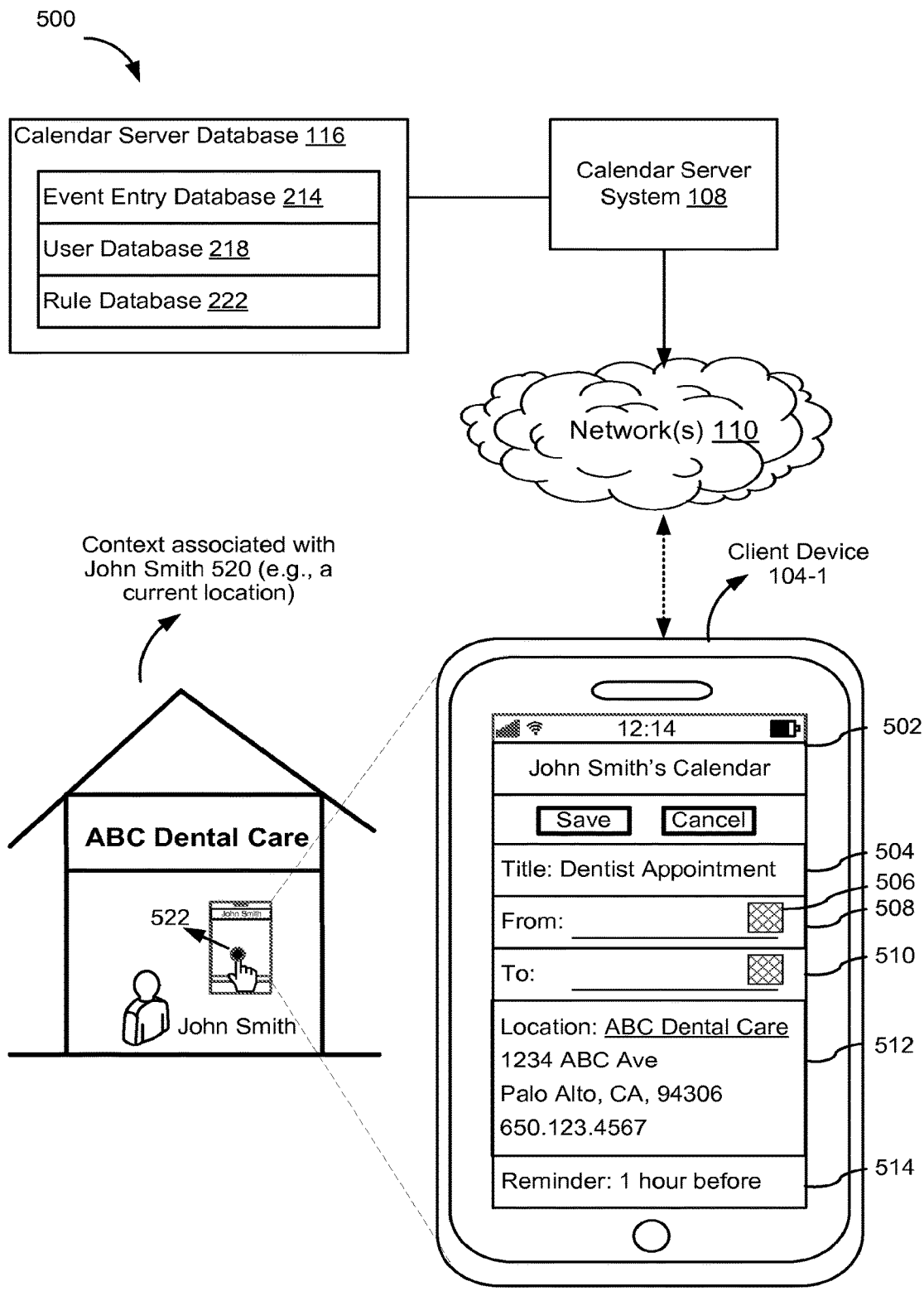
FIGS. 5A-5B are exemplary embodiments of server-client environments in which graphical user interfaces display context-based event entries created in accordance with some embodiments.

FIG. 5A is an exemplary embodiment of a server-client environment 500 including a graphical user interface 502 for a context-based event entry created in accordance with some embodiments. The server-client environment 500 includes the server system 108 and client device 104-1 communicating with each other using the networks 110.

In some embodiments, a user, e.g., John Smith, taps (522) the calendar icon on the screen of client device 104-1 to open an electronic calendar associated with John Smith, and then presses (522) the "add" button (not shown in FIG. 5A) on the user interface to create an event entry. No indication of the subject of the event entry is included in the triggering event, in this example pressing the "add" button, initiated by John Smith. In response to the triggering event 522, client device 104-1 sends a request to calendar server system 108 to create an event entry.

In some embodiments, in response to the request to create an event entry, client device 104-1 identifies one or more context items (520) associated with John Smith, such as a current location of the user, John Smith, at the ABC Dental Care. The client device 104-1 may send the current location information of John Smith to calendar server system 108. In some embodiments, the current geological location is identified using GPS, or mobile operation network, or any suitable technology. In some embodiments, client device 104-1 and/or calendar server system 108 also identify other context items (520) based on information stored at the event entry database at client device 104-1 and/or calendar server system 108, respectively, such as the user's recent dentist appointment at the ABC Dental Care.

In some embodiments, in response to the request to create an event entry, calendar server system 108 selects a rule from among the rules in rule database 222, based on the identified one or more context items 520 associated with John Smith. For example, calendar server system 108 identifies the current location of John Smith and a recent appointment as context items, and identifies one or more rules in accordance with those context items. Calendar server system 108 then selects a particular rule that is a best match to the context items, creates an event entry based on the event pattern of the selected rule, and sends the created event entry to client device 104-1 for display on user interface 502.

As shown as an example in FIG. 5A, the event entry includes multiple fields, such as an event title field 504, a start date/time field 508, an end date/time field 510, a location field 512, and a reminder field 514. In some embodiments, some fields of the event entry are pre-filled in accordance with the identified context items 520. For example as shown in FIG. 5A, the event title field 504 is pre-filled with "Dentist Appointment", based on John Smith's recent dentist appointment at the ABC Dental Care. The location field 512 is pre-filled with the location of ABC Dental Care, which may be extracted from the location field of the previous appointment entry, or based on the current location of John Smith, or based on a contact list entry for ABC Dental care in the user's contact list. The reminder field 514 is also pre-filled in accordance with the information from the previous appointment entry. In some embodiments, other fields of the event entry, such as the start date/time filed 508 and the end date/time field 510, are unfilled and thus require input from the user's entries. For example, as shown in FIG. 5A, an icon 506 is displayed with the start date/time field 508, and upon pressing the icon 506, the user is prompted to select a desired start date/time (e.g., using a displayed electronic calendar or GUI mechanism).

Figure 5B:
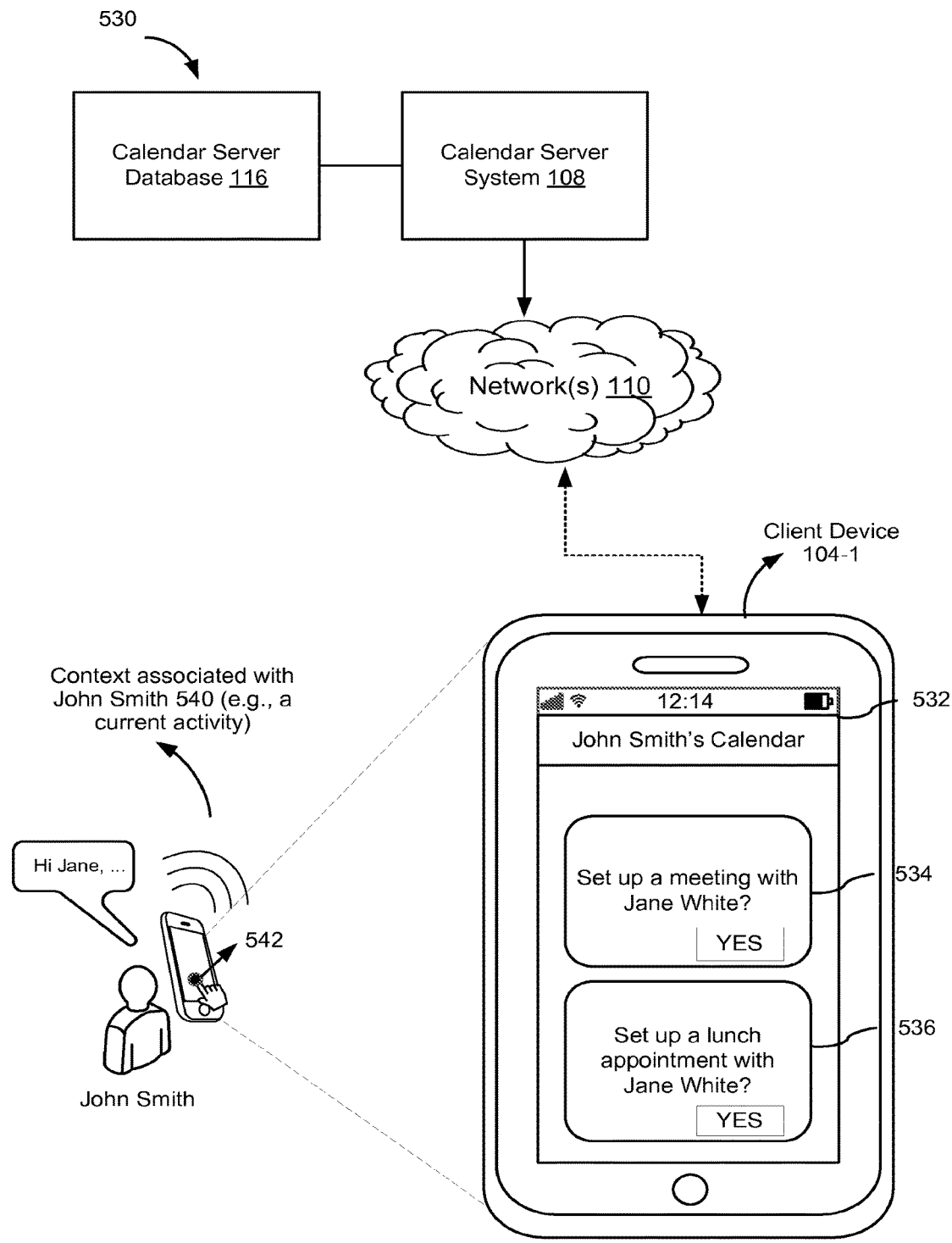

FIG. 5B is an exemplary embodiment of a server-client environment 530, including a client device 104-1 having a graphical user interface 532, for a context-based event entry created in accordance with some embodiments. In some embodiments, a user, e.g., John Smith, initiates a triggering event 542, such as tapping a calendar icon and pressing an "add" button, or issuing a voice command entry such as "create a calendar entry". The triggering event 542 does not indicate the subject of the event entry to be created. Client device 104-1 sends a request to create an event entry to server system 108 via network(s) 110. In some embodiments, client device 104-1 and/or server system 108 detect one or more context items 540 of John Smith, such as a current activity of John Smith making a phone call to Jane White. Other examples of context items 540 include recent events of John Smith, such as a lunch appointment with Jane White, an/or a recent meeting appointment with Jane White.

In some circumstances, calendar server system 108 determines that the detected context items 540 of John Smith match context parameters of more than one rule in a rule database. For example, the current activity of calling Jane White, and the recent respective appointments with Jane White, i.e., a lunch appointment and a meeting appointment, match respective context parameters associated with more than one rule. The multiple rules include a first rule, the application of which would create a lunch appointment with Jane White, and a second rule, the application of which would create a meeting appointment with Jane White. Therefore, more than one candidate event entry can be created based on the multiple rules. In some embodiments, calendar server system 108 sends a request to client device 104-1 requesting the user to select from two or more event entries, such as event entries 534 and 544 shown in the user interface 532. In response to the user's selection, the user-selected event entry, including multiple editable fields, is displayed on the user interface.

Figure 5C:
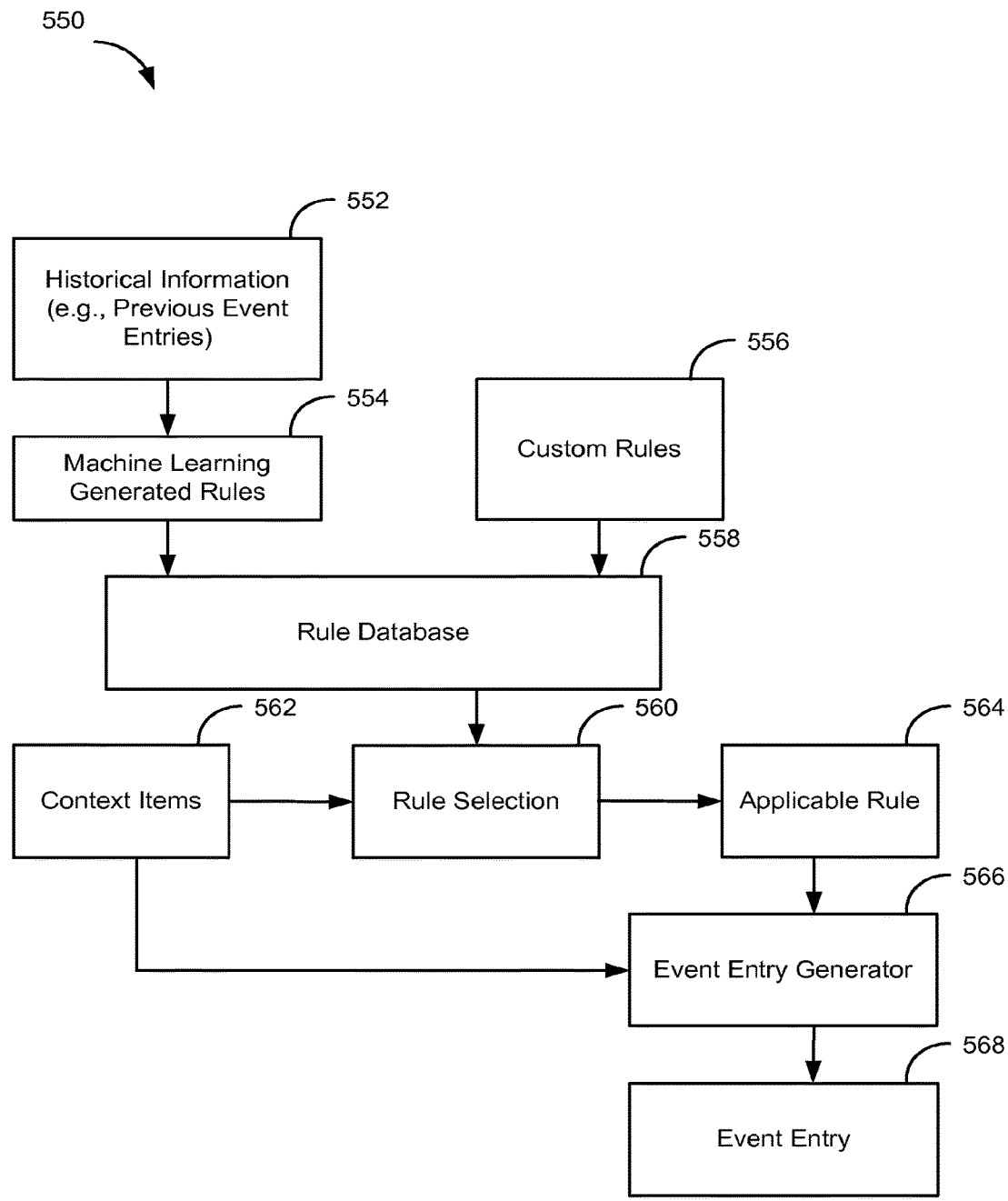
FIG. 5C is a block diagram representing a method of creating context-based event entries in accordance with some embodiments.

FIG. 5C is a block diagram representing a method 550 of creating context-based event entries in accordance with some embodiments. As shown in FIG. 5C, a rule database 558 (e.g., rule database 460 of FIG. 4C) stores various rules used for creating context-based event entries. The rules include machine learning generated rules 554 (e.g., corresponding to generated rules 226 of FIG. 2), generated based on historical information 552 associated with a user. The historical information 552 includes information associated with previous event entries stored in an event entry database (e.g., event entry database 400 of FIG. 4A). The rules in rule database 558 optionally also include custom rules 556 (e.g., custom rules 224 of FIG. 2), such as "hand-written" or otherwise customized rules provided by a user or system administrator or the like.

In some embodiments, the client device (e.g., client device 104-1, FIGS. 1, and 3A-3B) detects context items 562 associated with a user (e.g., a current location of the user, a current activity of the user, etc.), and sends the detected context items 562 to the server (e.g., calendar server system 108, FIGS. 1-2). In some embodiments, the server also detects the context items 562 of the user, such as previous event entries of the user stored at an event entry database (e.g., event entry database 214, FIG. 2) at the server.

In response to a request to create an event entry from the user, the server (e.g., rule selecting module 240 of calendar server system 108, FIG. 2) selects (560) an applicable rule from the rule database 558. In some embodiments, the server (e.g., rule selecting module 240, FIG. 2) determines that the detected context items 562 of the user match one or more context parameters associated with a rule, and that rule is selected to be the applicable rule 564. Applicable rule 564 provides an event pattern (e.g., event pattern 474 of FIG. 4C), which is used for creating an event entry 568 for the user.

In some embodiments, event entry generator 566 at the server (e.g., context-based event entry creating module 236 of calendar server system 108, FIG. 2) creates event entry 568 in accordance with the event pattern of applicable rule 564 and detected context items 562 of the user. The server then sends the created event entry 568 to the client device associated with the user for display. Created event entry 568 includes multiple editable fields, including one or more fields pre-filled using information from detected context items 562. The multiple editable fields may also include other fields which require an input from the user as discussed earlier with respect to FIG. 5A.

FIGS. 6A-6E are flowchart diagrams illustrating a method 600 of creating context-based event entries in accordance with some embodiments. Method 600 is performed by a computer system, such as calendar server system 108, FIGS. 1-2, having one or more processors and memory storing programs (e.g., calendar module 330) executed by the one or more processors. In some embodiments, the computer system that performs method 600 is a client device (e.g., client device 104-1, FIGS. 1 and 3A) having one or more processors and memory storing programs (e.g., calendar module 330, FIG. 3A) executed by the one or more processors. In some embodiments, method 600 is governed by instructions that are stored in a non-transitory computer readable storage medium and the instructions are executed by one or more processors (e.g., CPUs 202, FIG. 2, or CPUs 302 of FIG. 3A) of the computer system. For ease of explanation, the following describes method 600 as performed by a server system (e.g., calendar server system 108, FIGS. 1-2). However, those skilled in the art will appreciate that in other embodiments, one or more of the operations described in method 600 are performed by a client device (e.g., client device 104-1, FIGS. 1 and 3A).

In method 600, a computer system receives (602) a content-less request to create an event entry. For example, the receiving operation may performed by request handling module 228 of calendar server system 108, FIG. 2. In some embodiments, the context-less request corresponds to a triggering event detected by an end device (e.g., client device 104-1, FIGS. 1 and 3A, or client device 104-2, FIGS. 1 and 3B). The triggering event is initiated by a user associated with the end device. In some embodiments, in response to detecting the triggering event, the end device generates the content-less request to create an event entry and sends the generated content-less request to the server system.

In some embodiments, the triggering event (e.g., triggering event 522 of FIG. 5A, or triggering event 542 of FIG. 5B) is (604) non-differentiating with respect to a subject of the event entry created in response to the received content-less request. For example, the triggering event does not include any indication of the subject of the event entry to be created. Thus, different instances of the same triggering event can be used for creating different event entries with various subjects and contents. Because the triggering event does not include any indication of the subject of the event entry, the generated content-less request to create an event entry also does not include any indication of the subject of the event entry.

In some embodiments or circumstances, the triggering event is a user action to create an event entry from a widget on the home screen of a client device, for example, opening a calendar application by tapping the calendar icon on the screen, and then pressing the "add" button on the user interface to create an event entry. In some circumstances the triggering event is a voice command to create an event entry. In another example, the triggering event is a user clicking on (or otherwise selecting) a field or a keyword from an email presented to the user (e.g., a date included in the email) on the user.

In response to the received content-less request (606), the computer system (e.g., rule selecting module 240 of calendar server system 108, FIG. 2) selects (608) an applicable rule (e.g., applicable rule 564, FIG. 5C) from a set of rules stored at the computer system. In some embodiments, the set of rules are stored in a rule database (e.g., rule database 222 of server system 108, FIG. 2, or rule database 348 of client device 104-1, FIG. 2A) of the server system. In some embodiments, the applicable rule is selected in accordance with one or more context items (e.g., context items 562 of FIG. 5C) distinct from the triggering event; the one or more context items comprise one or more context items for the user; and the set of rules stored at the rule database comprise a plurality of distinct rules.

In some embodiments, the computer system (e.g., context-based event entry creating module 236 of calendar server system 108, FIG. 2) determines (614) a subject of the event entry to be created solely in accordance with at least one of the one or more context items for the user. In some embodiments, the subject is determined after the server system selects the applicable rule.

In some embodiments, prior to receiving the content-less request to create an event entry, the computer system stores (616) the one or more context items for the user. In some embodiments, at least one of the one or more context items is detected by the end device. In some embodiments, the one or more context items are stored in a user database of the computer system (e.g., user database 218 of server system 108, FIG. 2, or context item(s) 349 in user database 344 of client device 104-1, FIG. 3A). The one or more context items for the user may also be stored at the end device (e.g., context item(s) 349 in user database 344, FIG. 3A, or context item(s) 379 in user database 374, FIG. 3B). In some embodiments, the context items stored in the user database are updated periodically based on, but not limited to, the current activities of the user, the received email records of the user, and/or the calendar entries of the user.

In some embodiments, the one or more context items for the user include, but are not limited to: a current location of the user (e.g., detected by a GPS receiver or application in a client device), and/or a current activity of the user. An example of a current activity of the user is an appointment with the dentist, which may be identified by an event entry in the user's calendar. In another example, the current activity is the user making a phone call to a particular person or entity. In another example, the current activity is sending or viewing an email message, or browsing a website on the end device, and in these circumstances, the current activity is detected either by the end device or by a server system (e.g., context detecting module 238 of calendar server system 108, FIG. 2) in communication with the user's end device. Thus, in some circumstances, the context items for the user, e.g., a current activity of the user, are determined based on both the user's online calendar and information from the user's device concerning the user's current location and/or the user's current activity. In some embodiments, the one or more context items for the user also include one or more recent activities of the user, where "recent activities" are activities that occurred in the recent past, for example. In some embodiments, the recent past is the last hour, or the last half hour, or the last quarter hour, etc. More generally, recent activities of the user are past activities of the user within a predetermined time threshold of the present time. In one example, a recent activity is a recent appointment with a particular person or entity having a corresponding calendar entry in the user's calendar. In another example, a recent activity is a recent communication, such as a recent telephone call to a particular person or entity, known to the end device or server (e.g., listed in a log record of an electronically stored activity log associated with the user).

In some embodiments, the server system stores (618) the set of rules in a rule database (e.g., rule database 222 of server system 108, FIG. 2, or rule database 348 of client device 104-1, FIG. 3A). In some embodiments, a respective rule of the set of rules correlates one or more context parameters (e.g., context parameters 1 through L, FIG. 4C) with a respective event pattern (event pattern 474, FIG. 4C).

In some embodiments as discussed above with respect to rule database 460 in FIG. 4C, the set of rules include both custom rules and generated rules. In some embodiments, the custom rules include rules for specific situations. Both the custom rules and the generated rules include information mapping specific context parameters, or portions thereof, to a specific event pattern with multiple fields in a template of the event entry. In some examples, a rule includes information that maps specific aspects of a current or recent appointment with a person or an entity, to one or more fields of an event pattern, which is used for creating an event entry for a future appointment with the same person or entity. In some examples, the context parameters relate to a current or recent appointment with a person or an entity, and a rule includes information that maps two or more aspects of the current or recent appointment (e.g., a subject, start/end times, a location, a reminder interval, etc.) to corresponding fields of an event pattern used for creating an event entry with two or more fields pre-filled. In some embodiments, the custom rules are pre-defined by the user, or pre-defined by a server administrator. In some embodiments, the rule database is organized as a lookup table or relational database to facilitate finding matching specific context parameters or combinations of context parameters.

After selecting the applicable rule, the computer system (e.g., event entry creating module 242 of calendar server system 108, FIG. 2) creates (610) an event entry in accordance with the selected applicable rule (e.g., applicable rule 564, FIG. 5C) and at least one of the one or more context items (e.g., context items 562, FIG. 5C) for the user. In some embodiments, the event entry includes one or more fields having content determined in accordance with the at least one of the one or more context items for the user. In some circumstances, the event entry includes two or more fields having content determined in accordance with two or more context items for the user.

In some embodiments, selecting (622) the applicable rule includes determining (624) whether at least one of the one or more context items matches a corresponding context parameter of the applicable rule. In accordance with a selection criterion, which includes a determination that at least one of the one or more context items matches a corresponding context parameter of the applicable rule, the computer system (e.g., rule selecting module 240 of calendar server system 108, FIG. 2) selects (626) the applicable rule, which correlates the corresponding context parameter of the applicable rule with the event pattern of the applicable rule.

In some embodiments, the computer system identifies (628) the at least one of the one or more context items that match a corresponding context parameter of the applicable rule. Stated another way, the computer system identifies context items of the user that correspond context parameters of the applicable rule. In some embodiments, creating (630) the event entry includes creating (632) the one or more fields of the event entry in accordance with the event pattern. Thus, one or more fields of the event entry are pre-filled with content in accordance with the identified context items that match corresponding context parameters of the applicable rule.

In some embodiments, a rule is determined to meet the selection criterion and thus is selected as the applicable rule.

An entry event is created based on the event pattern of the selected applicable rule. For example, if the current context items include a detected location that matches a location of a current appointment (e.g., a dentist appointment) in the user's calendar, a rule related to "a repeat appointment" is selected. The rule of "a repeat appointment" causes creation of an event entry for a next appointment with the same person or entity as the current appointment. Optionally, each rule is assigned a weighted likelihood value (e.g., a percentage or numerical rank) used to evaluate the selection criterion, e.g., a likelihood of being selected, with respect to that rule.

In some embodiments, the computer system (e.g., machine learning module 234 of calendar server system 108, FIG. 2) uses (634) machine learning to generate a plurality of rules in the set of rules (e.g., one or more rules of rule 1 through rule N, FIG. 4C). Each rule correlates (634) one or more context parameters with a respective event pattern. In some embodiments, the event pattern of each rule in the plurality of rules corresponds (636) to one or more previous event entries of the user or a community of users. Each of one or more previous event entries includes (636) one or more fields with previous event information. In some embodiments, the context parameters of a respective rule of the plurality of rules correspond (638) to context items that are associated with the previous event entries, and the previous event entries correspond (638) to the respective rule. As described elsewhere in this document, in some embodiments, data related to previous event entries associated with a user, including context items associated with the generation of the previous event entries (e.g., associated context item(s) 429, FIG. 4A) are used for performing the machine learning process and to generate a rule that can be used to create a future event entry.

Figure 6A:
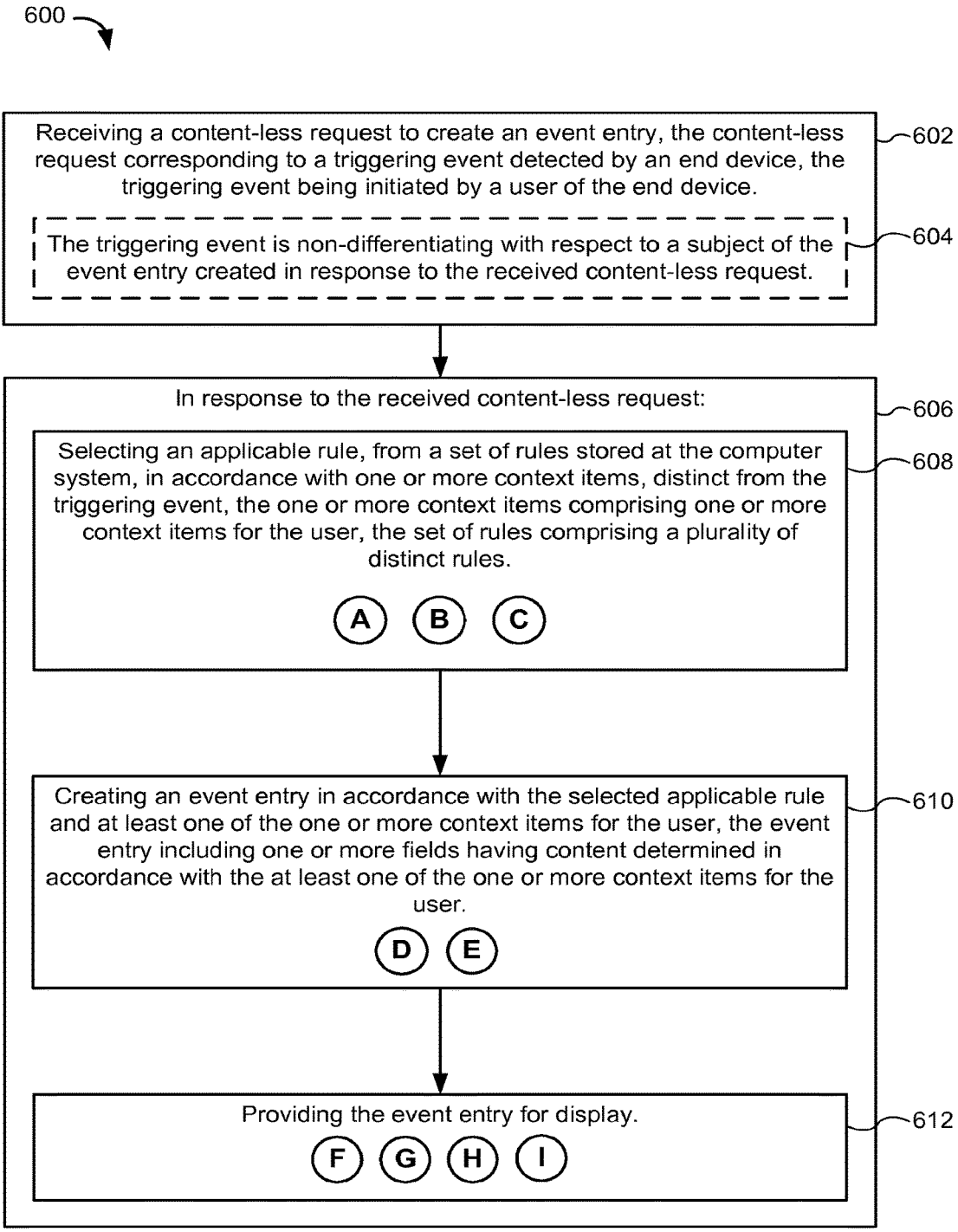
FIGS. 6A-6E are flowchart diagrams illustrating a method of creating context-based event entries in accordance with some embodiments.
Figure 6B:
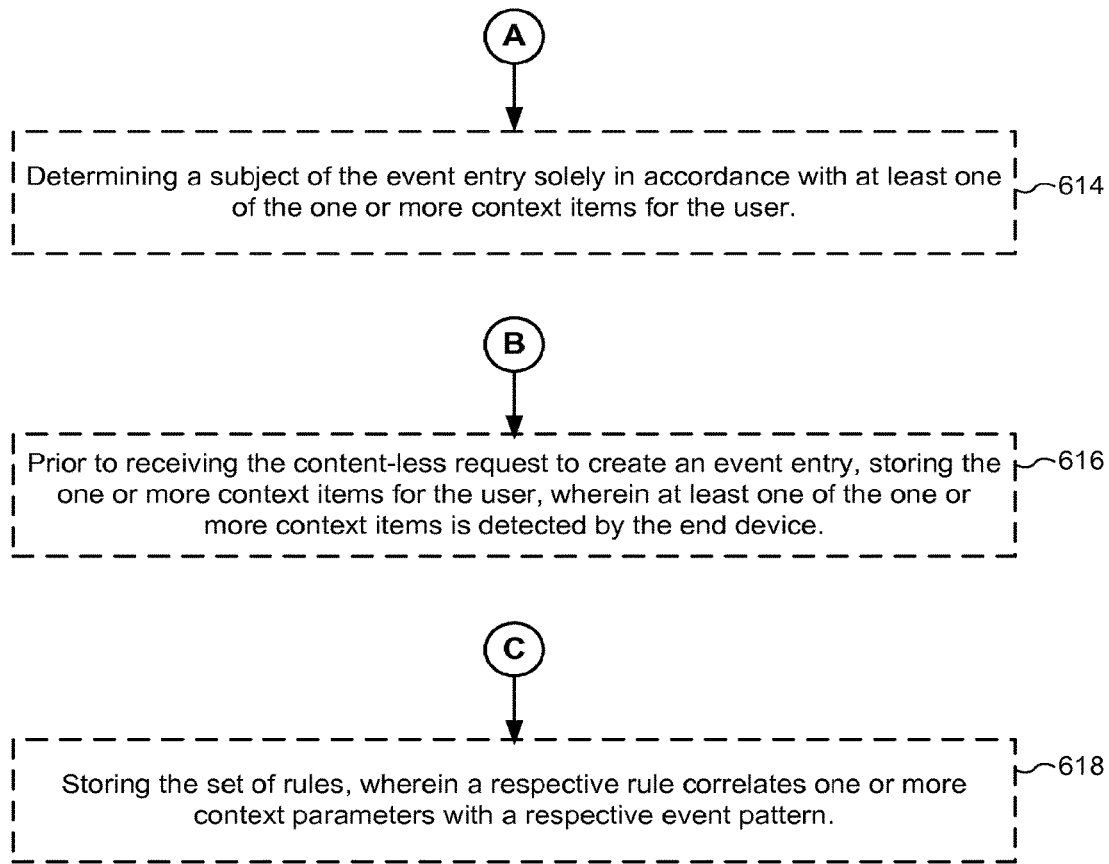
Figure 6C:
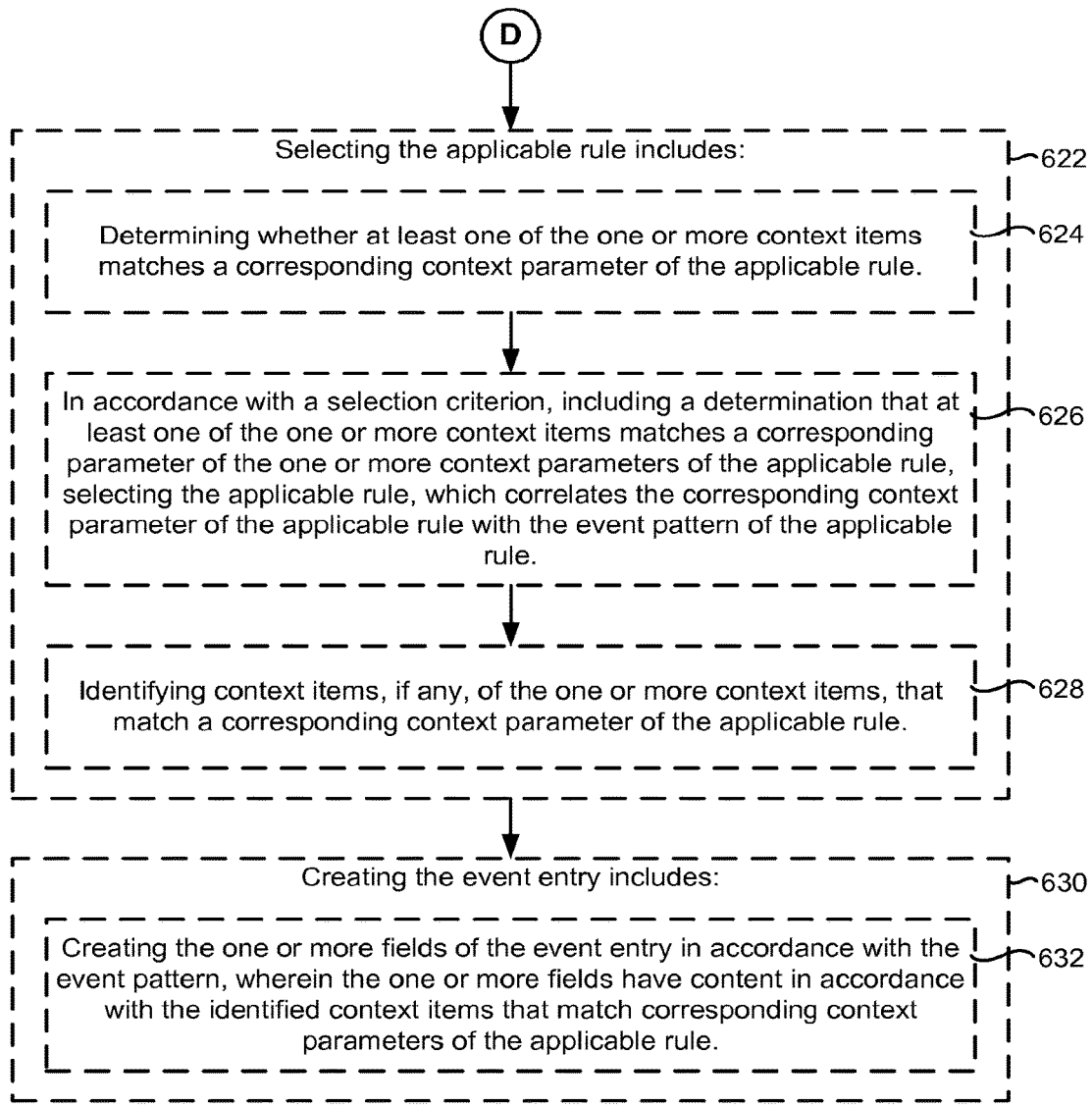
Figure 6D:
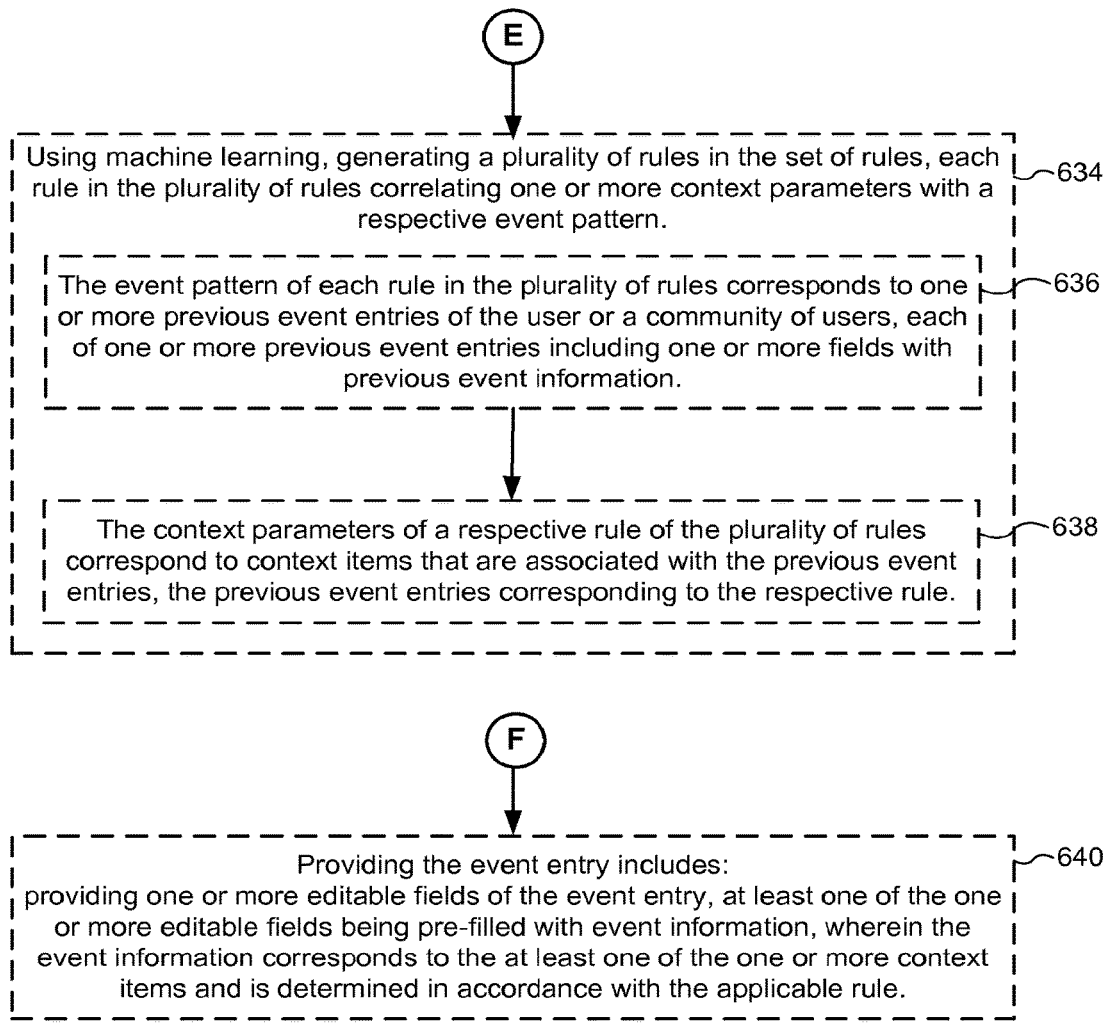
Figure 6E:
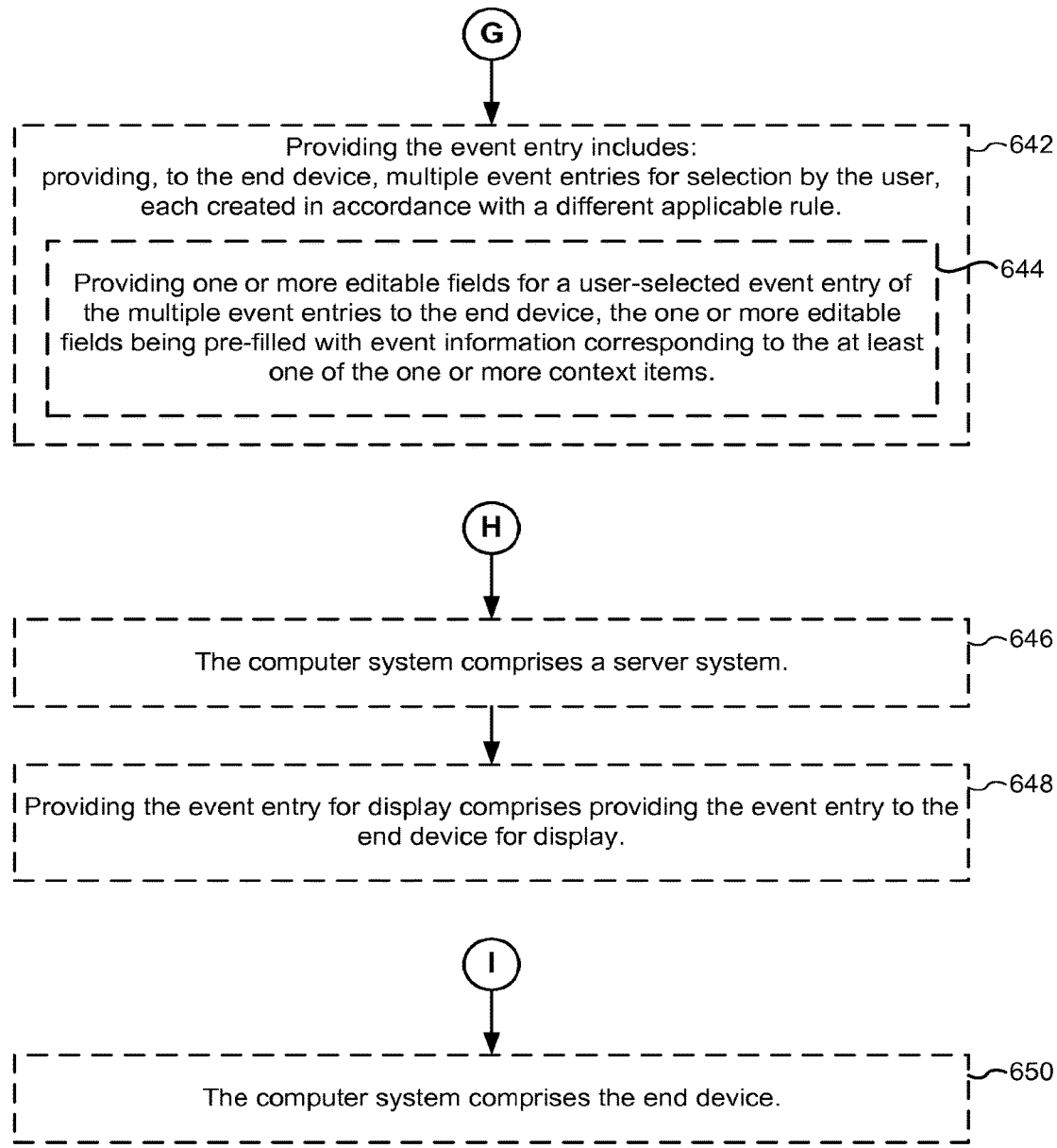

As shown in FIG. 6A, after creating the event entry in accordance with the selected applicable rule, the computer system (e.g., event presentation module 230 of calendar server system 108, FIG. 2) provides (612) the created event entry for display. In some embodiments, providing an event entry for display includes providing (640) one or more editable fields of the event entry, where at least one of the one or more editable fields is pre-filled with event information, and the event information corresponds to one or more context items of the user and is determined in accordance with the selected applicable rule.

In some embodiments, the computer system (e.g., event presentation module 230 of calendar server system 108, FIG. 2) provides (642) multiple event entries to the end device for selection by the user, where each of the multiple event entries is created in accordance with a different applicable rule. In some circumstances, two or more of the multiple event entries have distinct subjects. In some embodiments, two or more of the multiple event entries are concurrently displayed on the user interface on the end device, and the user selects a desired event entry among the multiple event entries to be created by tapping or voice selecting the desired event entry. In some embodiments, the computer system (e.g., event presentation module 230 of calendar server system 108, FIG. 2) provides (644) to the end device one or more editable fields for a user-selected event entry of the multiple event entries, the one or more editable fields being pre-filled with event information that corresponds to one or more context items for the user.

In some embodiments, the computer system performing method 600 comprises (646) a server system (e.g., calendar server system 108, FIGS. 1-2), which provides (648) the event entry to the end device (e.g., client device 104-1, FIGS. 1 and 3A, or client device 104-2, FIGS. 1 and 3B) for display. In some embodiments, the computer system comprises (650) an end device (e.g., client device 104-1, FIGS. 1 and 3A, or client device 104-2, FIGS. 1 and 3B), in which case the end device provides the created event entry to a display device of the end device so as to display the created event entry.

Each of the methods described herein is typically governed by instructions that are stored in a computer readable storage medium and that are executed by one or more processors of one or more servers or client devices. The above identified modules or programs (i.e., sets of instructions) need not be implemented as separate software programs, procedures or modules, and thus various subsets of these modules will be combined or otherwise re-arranged in various embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method performed by a calendar server system with one or more processors and memory, the method comprising:

receiving, by a calendar server system and from a client device having an electronic calendar, event entries and context items associated with the event entries, wherein the calendar server system is configured for receiving requests from client devices, providing data processing to at least create event entries, and providing the created event entries to respective electronic calendars on the client devices;

storing multiple rules generated by a machine learning process using data related to the received event entries and context items;

receiving, from the client device, a request to create an event entry, the request triggered by user activation of an add calendar entry control that is available when the electronic calendar runs on the client device, the request including one or more current context items including a current activity, the one or more current context items generated by the client device; and in response to the received request, performing the data processing that includes at least:

selecting a rule, from the multiple rules generated by the machine learning process, based on the one or more current context items, distinct from the user activation of the add calendar entry control, the one or more current context items comprising one or more context items for the user;

creating an event entry based on at least: (i) the selected rule, (ii) at least one of the event entries, and (iii) at least one of the one or more current context items including the current activity, the event entry including multiple fields, one or more of the multiple fields having content determined by the calendar server system in accordance with the selected rule and at least one of the one or more current context items, at least some of the content obtained from the at least one of the event entries; and sending the event entry to the client device, wherein any of the multiple fields for which the calendar server system does not determine the content are empty in the sent event entry.

2. The method of claim 1, further including determining a subject of the event entry solely in accordance with at least one of the current context items and including the determined subject in at least one of the multiple fields of the event entry.

3. The method of claim 1, wherein the user activation of the add calendar entry control is non-differentiating with respect to a subject of the event entry created in response to the received request.

4. The method of claim 1, further comprising:
prior to receiving the request to create an event entry, storing the one or more current context items.

5. The method of claim 1, further comprising:
generating the multiple rules by the machine learning process, wherein a respective rule correlates one or more context parameters with a respective event pattern.

6. The method of claim 1, wherein:
selecting the rule includes:
determining whether at least one of the current context items matches a corresponding context parameter of the selected rule;
in accordance with a selection criterion, including a determination that at least one of the one or more current context items matches a corresponding context parameter of the selected rule, selecting the rule, which correlates the corresponding context parameter of the selected rule with an event pattern of the selected rule; and
identifying context items, if any, of the one or more current context items, that match the corresponding context parameter of the selected rule; and
creating the event entry includes:
creating the one or more fields of the event entry in accordance with the event pattern of the selected rule, wherein the one or more fields have content in accordance with the identified context items that match corresponding context parameters of the selected rule.

7. The method of claim 1, wherein the event entry sent to the client device includes:
one or more editable fields, at least one of the one or more editable fields being pre-filled with event information, wherein the event information corresponds to the at least one of the one or more current context items based on the selected rule.

8. The method of claim 1, further comprising:
sending multiple event entries to the client device for selection by the user, each created in accordance with a different selected rule.

9. The method of claim 8, further comprising:
including one or more editable fields for a user-selected event entry in the multiple event entries sent to the client device, the one or more editable fields being pre-filled with event information corresponding to the at least one of the one or more current context items.

10. The method of claim 1, wherein:
sending the event entry to the client device comprises sending the event entry to the client device for display on the client device.

11. The method of claim 1, wherein:
the one or more current context items further includes a past activity within a predetermined time threshold.

12. The method of claim 1, further comprising:
storing, by the calendar server system, the event entries in an event entry database accessible to the machine learning process.

13. A calendar server system, comprising:
one or more processors; and
memory storing one or more programs, which when executed by the one or more processors cause the calendar server system to perform operations comprising:
receiving, from a client device having an electronic calendar, event entries and context items associated with the event entries, wherein the calendar server system is configured for receiving requests from client devices, providing data processing to at least create event entries, and providing the created event entries to respective electronic calendars on the client devices;
storing multiple rules generated by a machine learning process using data related to the received event entries and context items;
receiving, from the client device, a request to create an event entry, the request triggered by user activation of an add calendar entry control that is available when the electronic calendar runs on the client device, the request including one or more current context items including a current activity, the one or more current context items generated by the client device; and
in response to the received request, performing the data processing that includes at least:
selecting a rule, from the multiple rules generated by the machine learning process, based on the one or more current context items, distinct from the user activation of the add calendar entry control, the one or more current context items comprising one or more context items for the user;
creating an event entry based on at least: (i) the selected rule, (ii) at least one of the event entries, and (iii) at least one of the one or more current context items including the current activity, the event entry including multiple fields, one or more of the multiple fields having content determined by the calendar server system in accordance with the selected rule and at least one of the one or more current context items, at least some of the content obtained from the at least one of the event entries; and
sending the event entry to the client device, wherein any of the multiple fields for which the calendar server system does not determine the content are empty in the sent event entry.

14. The calendar server system of claim 11, wherein the one or more programs include instructions for determining a subject of the event entry solely in accordance with at least one of the current context items and including the determined subject in at least one of the multiple fields of the event entry.

15. The calendar server system of claim 11, wherein the user activation of the add calendar entry control is non-differentiating with respect to a subject of the event entry created in response to the received request.

16. The calendar server system of claim 11, wherein:
selecting the rule includes:
determining whether at least one of the current context items matches a corresponding context parameter of the selected rule;

in accordance with a selection criterion, including a determination that at least one of the one or more current context items matches a corresponding context parameter of the selected rule, selecting the rule, which correlates the corresponding context parameter of the selected rule with an event pattern of the selected rule; and identifying context items, if any, of the one or more current context items, that match the corresponding context parameter of the selected rule; and creating the event entry includes:

creating the one or more fields of the event entry in accordance with the event pattern, wherein the one or more fields have content in accordance with the identified context items that match corresponding context parameters of the selected rule.

17. A non-transitory computer readable storage medium, storing one or more programs for execution by a calendar server system having one or more processors, the one or more programs including instructions that when executed by the calendar server system cause the calendar server system to:

receive, from a client device having an electronic calendar, event entries and context items associated with the event entries, wherein the calendar server system is configured for receiving requests from client devices, providing data processing to at least create event entries, and providing the created event entries to respective electronic calendars on the client devices;

store multiple rules generated by a machine learning process using data related to the received event entries and context items;

receive, from the client device, a request to create an event entry, the request triggered by user activation of an add calendar entry control that is available when the electronic calendar runs on the client device, the request including one or more current context items including a current activity, the one or more current context items generated by the client device; and in response to the received request, performing the data processing that includes at least:

select a rule, from the multiple rules generated by the machine learning process based on the one or more current context items, distinct from the user activation of the add calendar entry control, the one or more current context items comprising one or more context items for the user;

create an event entry based on at least: (i) the selected rule, (ii) at least one of the event entries, and (iii) at least one of the one or more current context items including the current activity, the event entry including multiple fields, one or more of the multiple fields having content determined by the calendar server system in accordance with the selected rule and at least one of the one or more current context items, at least some of the content obtained from the at least one of the event entries; and send the event entry to the client device, wherein any of the multiple fields for which the calendar server system does not determine the content are empty in the sent event entry.

18. The non-transitory computer readable storage medium of claim 17, wherein the one or more programs include instructions for determining a subject of the event entry solely in accordance with at least one of the current context items and including the determined subject in at least one of the multiple fields of the event entry.

19. The non-transitory computer readable storage medium of claim 17, wherein the user activation of the add calendar entry control is non-differentiating with respect to a subject of the event entry created in response to the received request.

20. The non-transitory computer readable storage medium of claim 17, wherein:

selecting the rule includes:

determining whether at least one of the current context items matches a corresponding context parameter of the selected rule;

in accordance with a selection criterion, including a determination that at least one of the one or more current context items matches a corresponding context parameter of the selected rule, selecting the rule, which correlates the corresponding context parameter of the applicable rule with an event pattern of the selected rule; and identifying context items, if any, of the one or more current context items, that match the corresponding context parameter of the selected rule; and creating the event entry includes:

creating the one or more fields of the event entry in accordance with the event pattern, wherein the one or more fields have content in accordance with the identified context items that match corresponding context parameters of the selected rule.

\* \* \* \* \*